Jan. 13, 1948.                W. LEATHERS ET AL                    2,434,500
                              ACCOUNTING MACHINE
                          Filed June 14, 1945          13 Sheets-Sheet 1

INVENTORS.
Ward Leathers,
Jerrier Haddad.
BY
                Att.

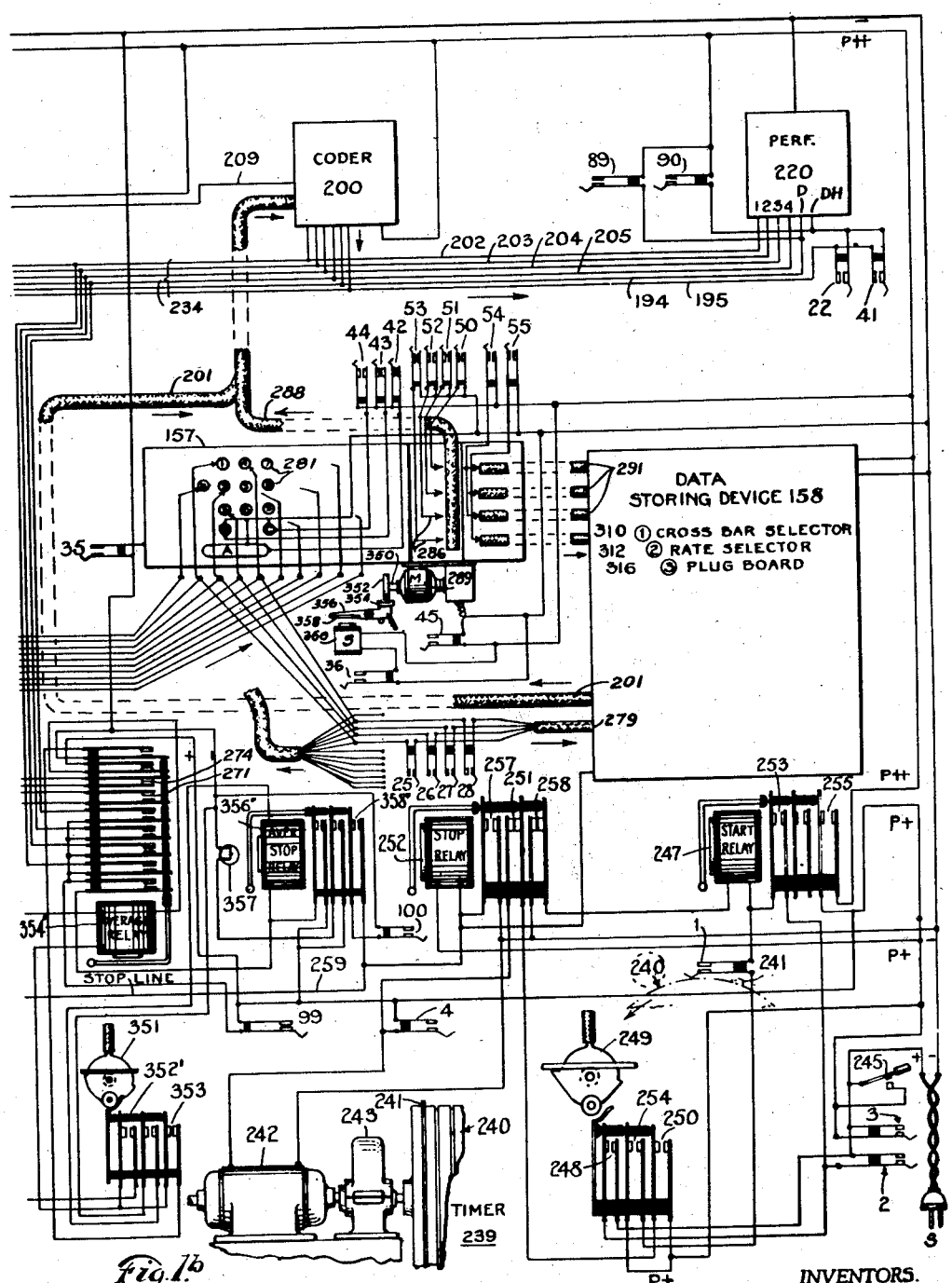

Jan. 13, 1948.   W. LEATHERS ET AL   2,434,500
ACCOUNTING MACHINE
Filed June 14, 1945   13 Sheets-Sheet 3
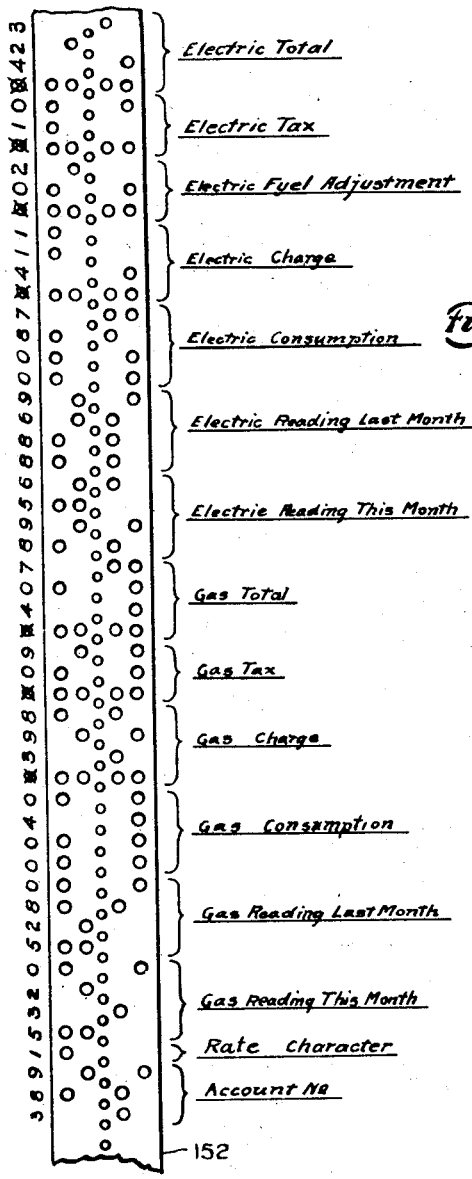
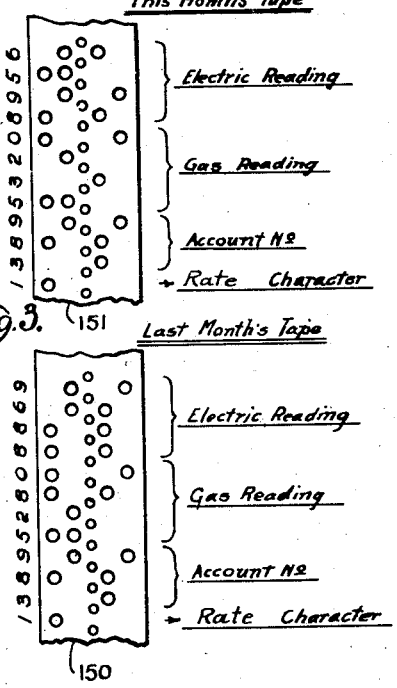
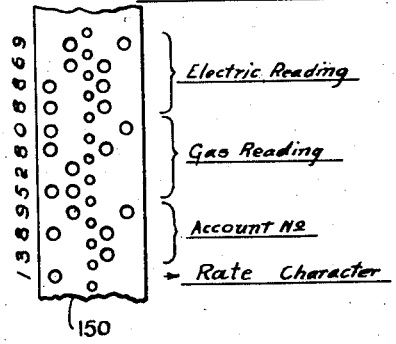
BILLING DATA TAPE
INVENTORS.
Ward Leathers,
Jerrier Haddad.
BY

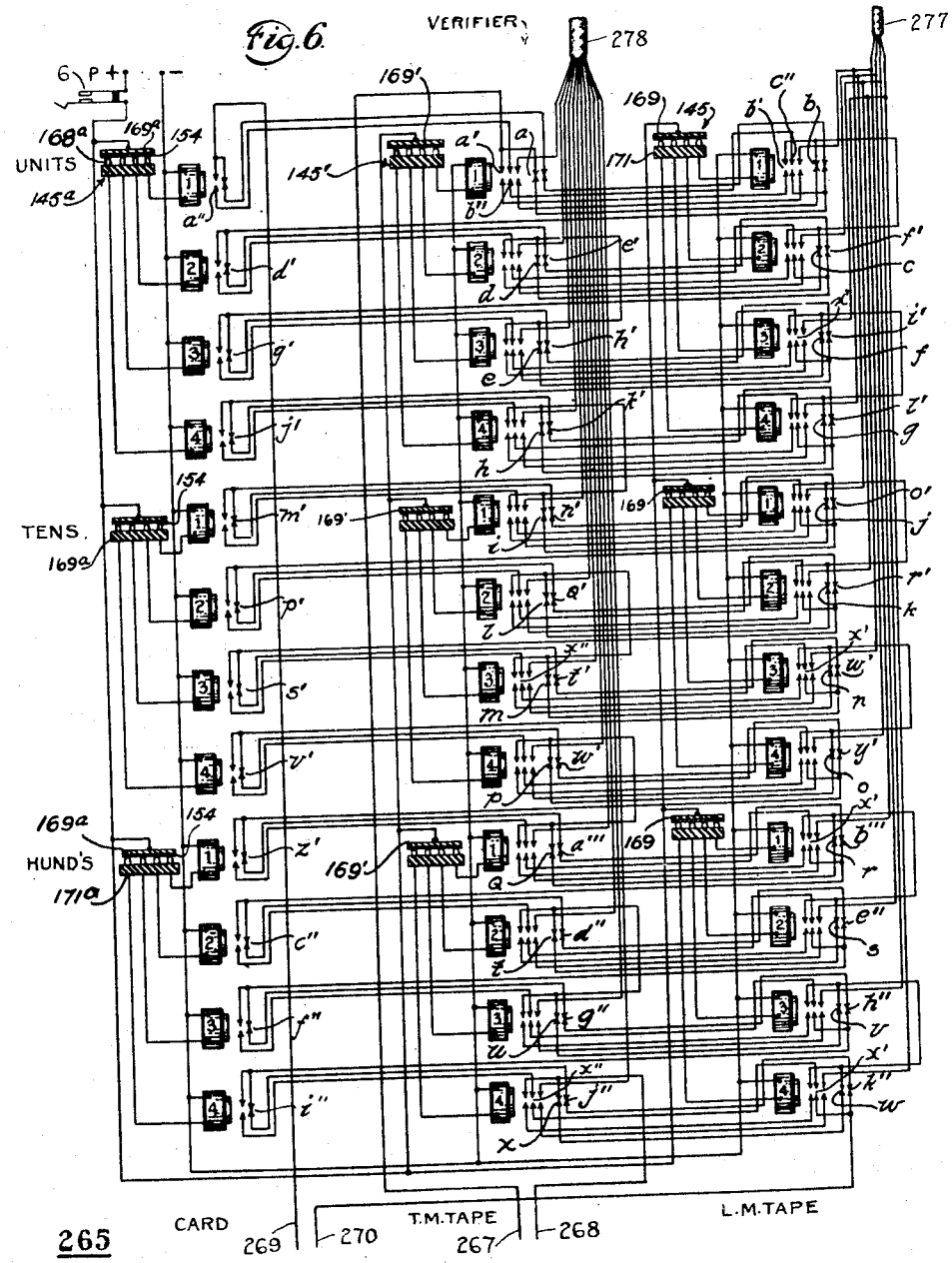

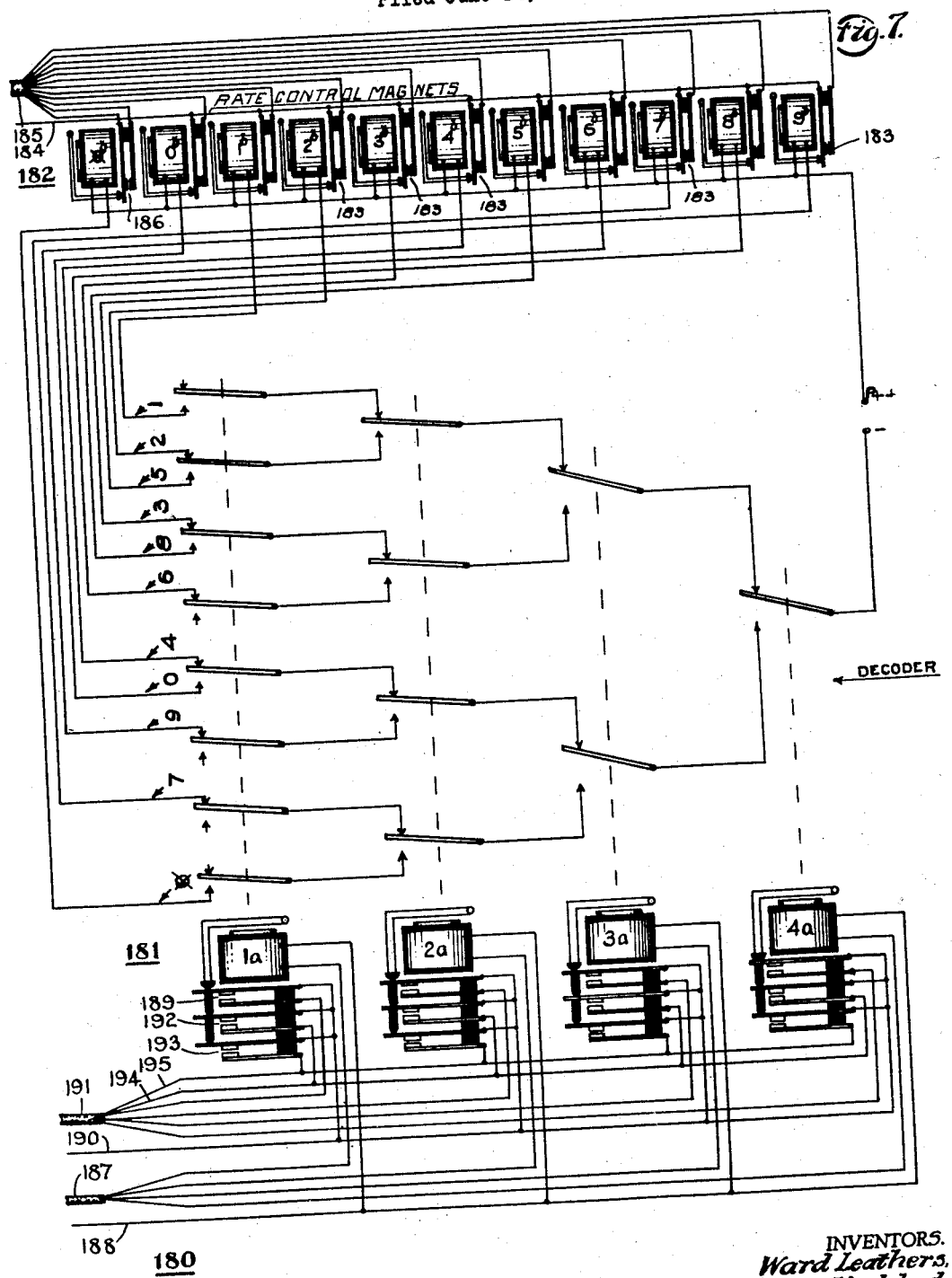

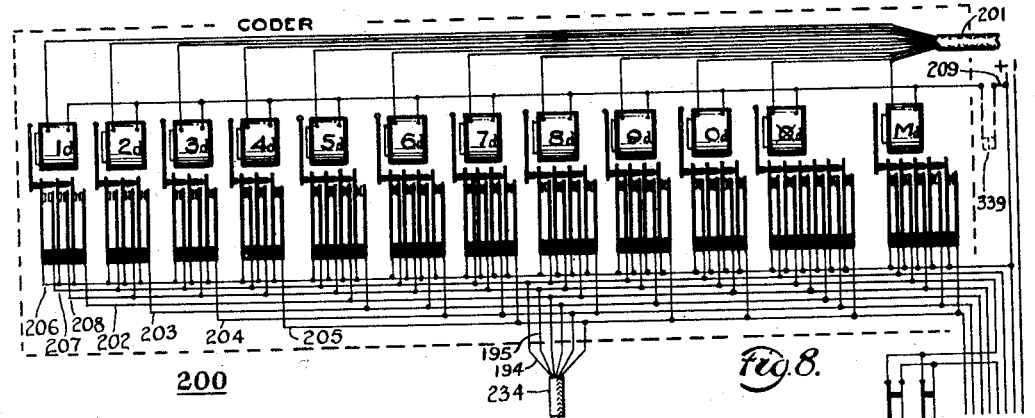
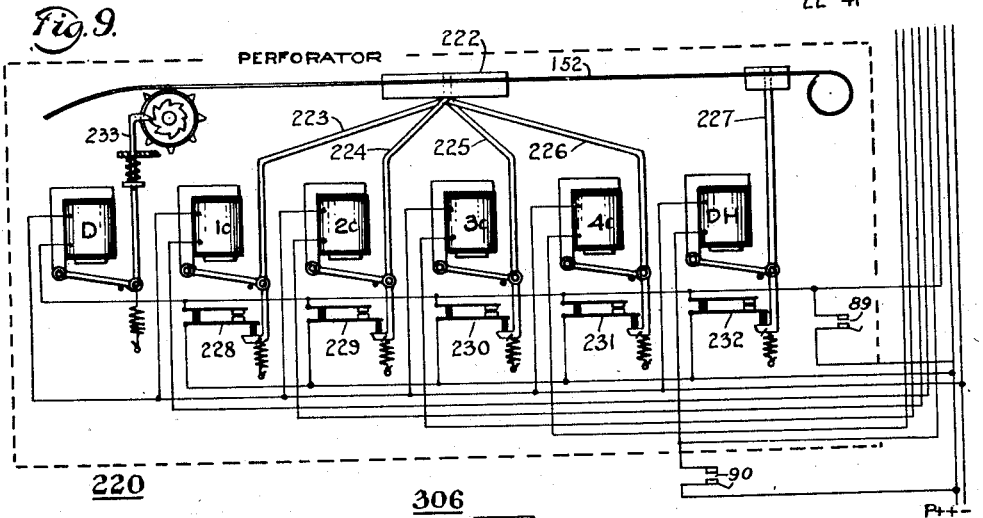
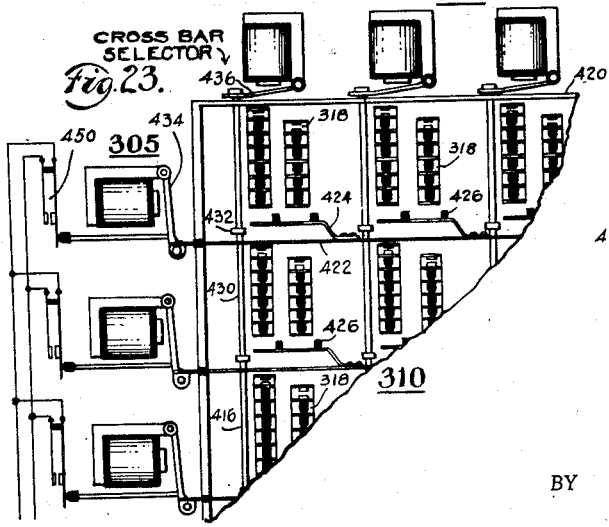
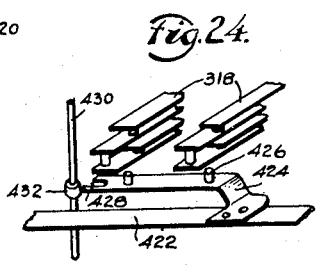

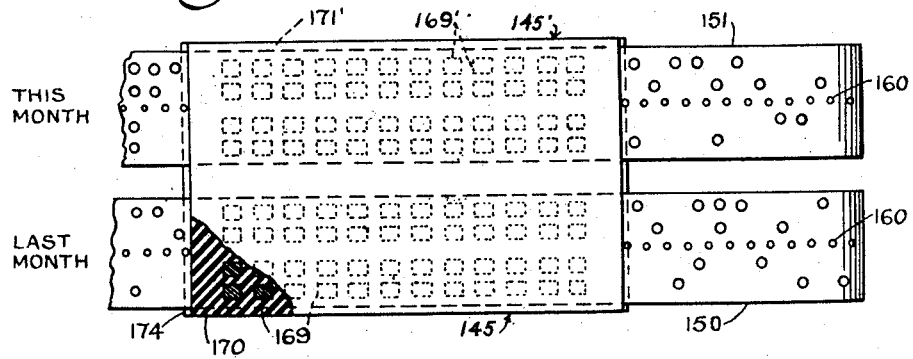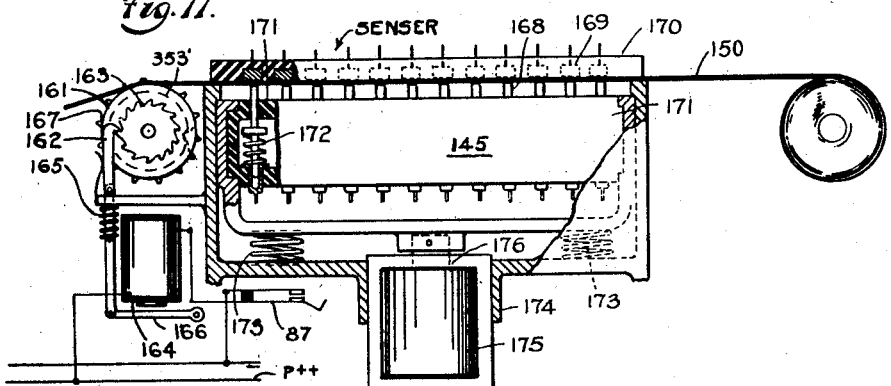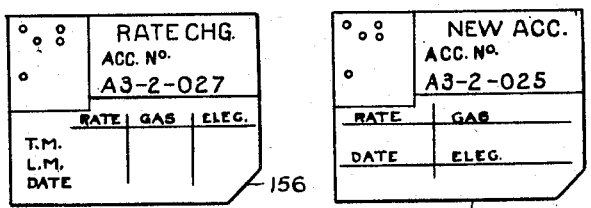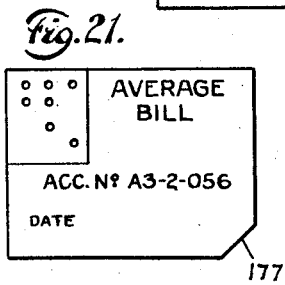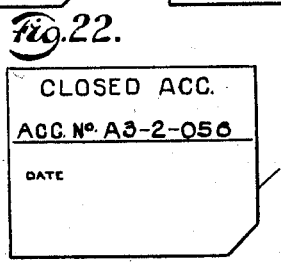

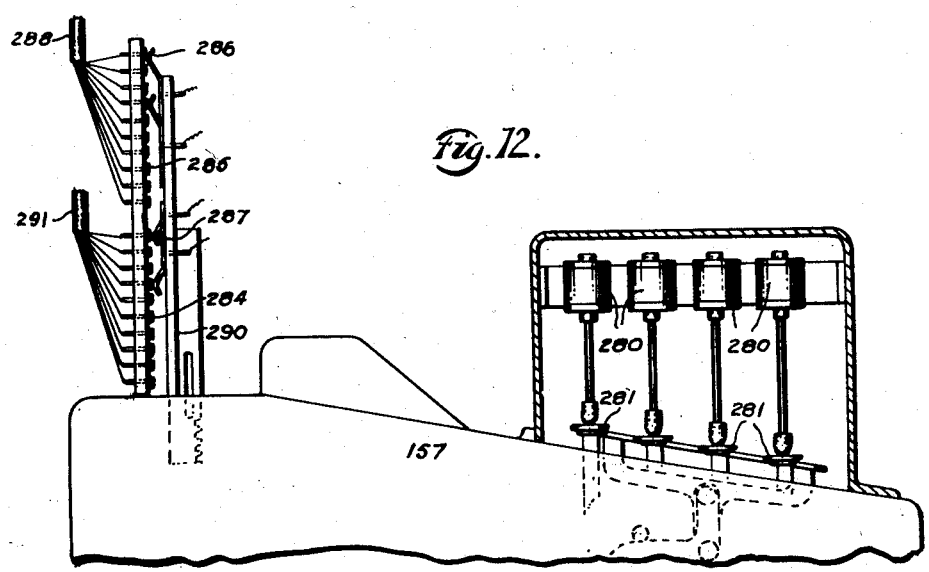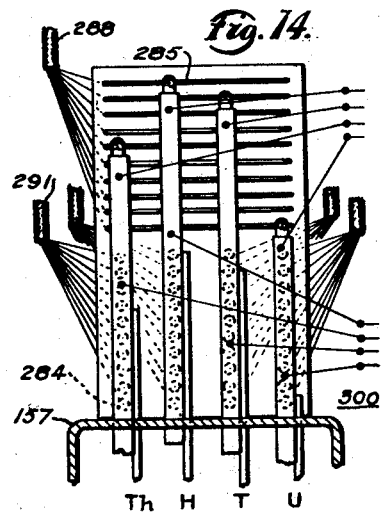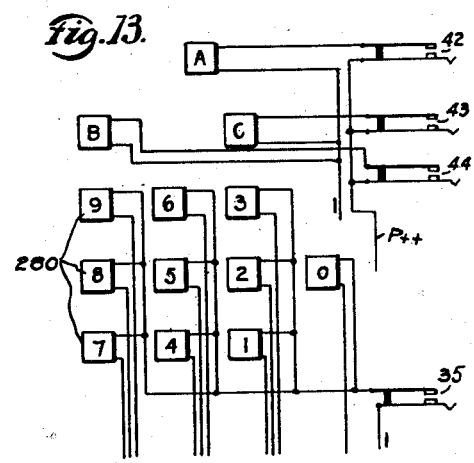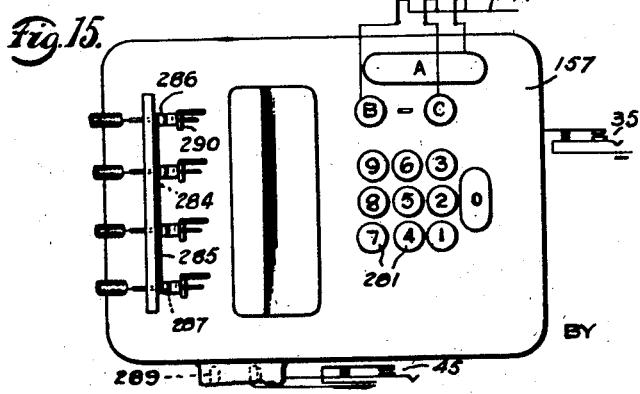

Jan. 13, 1948.　　　W. LEATHERS ET AL　　　2,434,500
ACCOUNTING MACHINE
Filed June 14, 1945　　　13 Sheets-Sheet 9
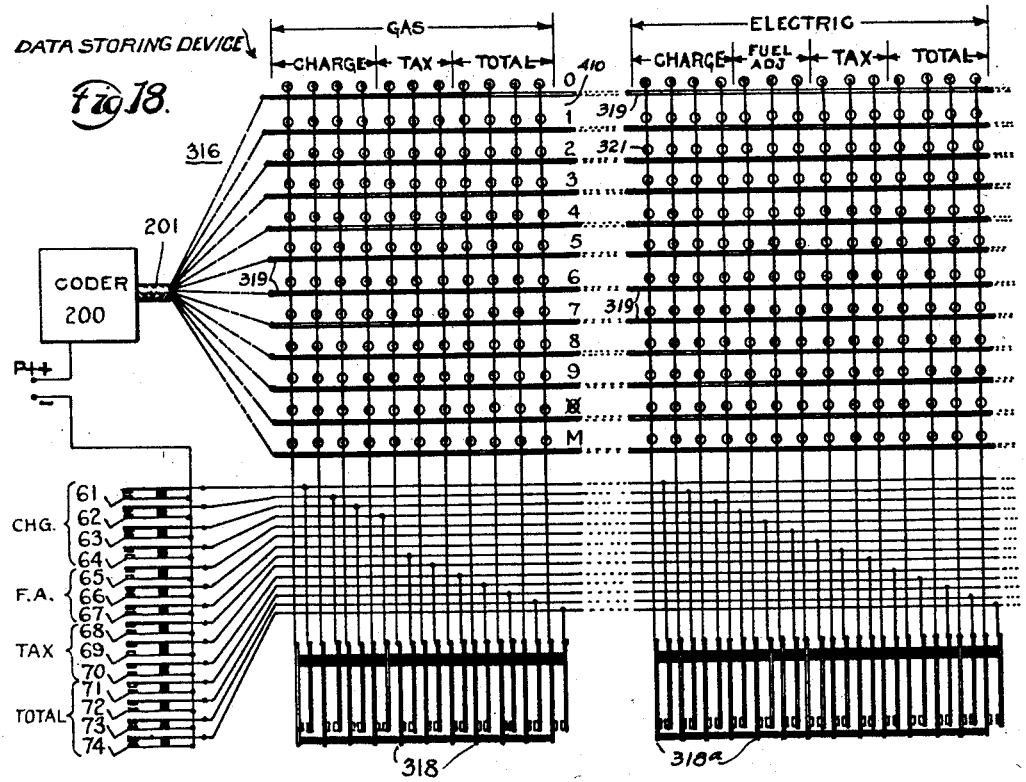
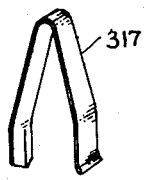
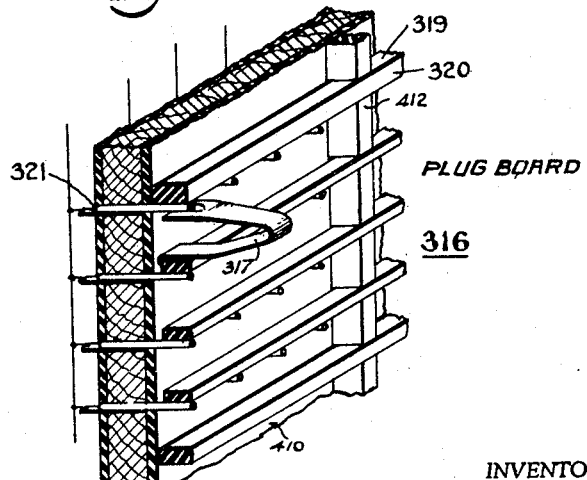
INVENTORS.
Ward Leathers,
Jerrier Haddad.
BY
ATTORNEY.

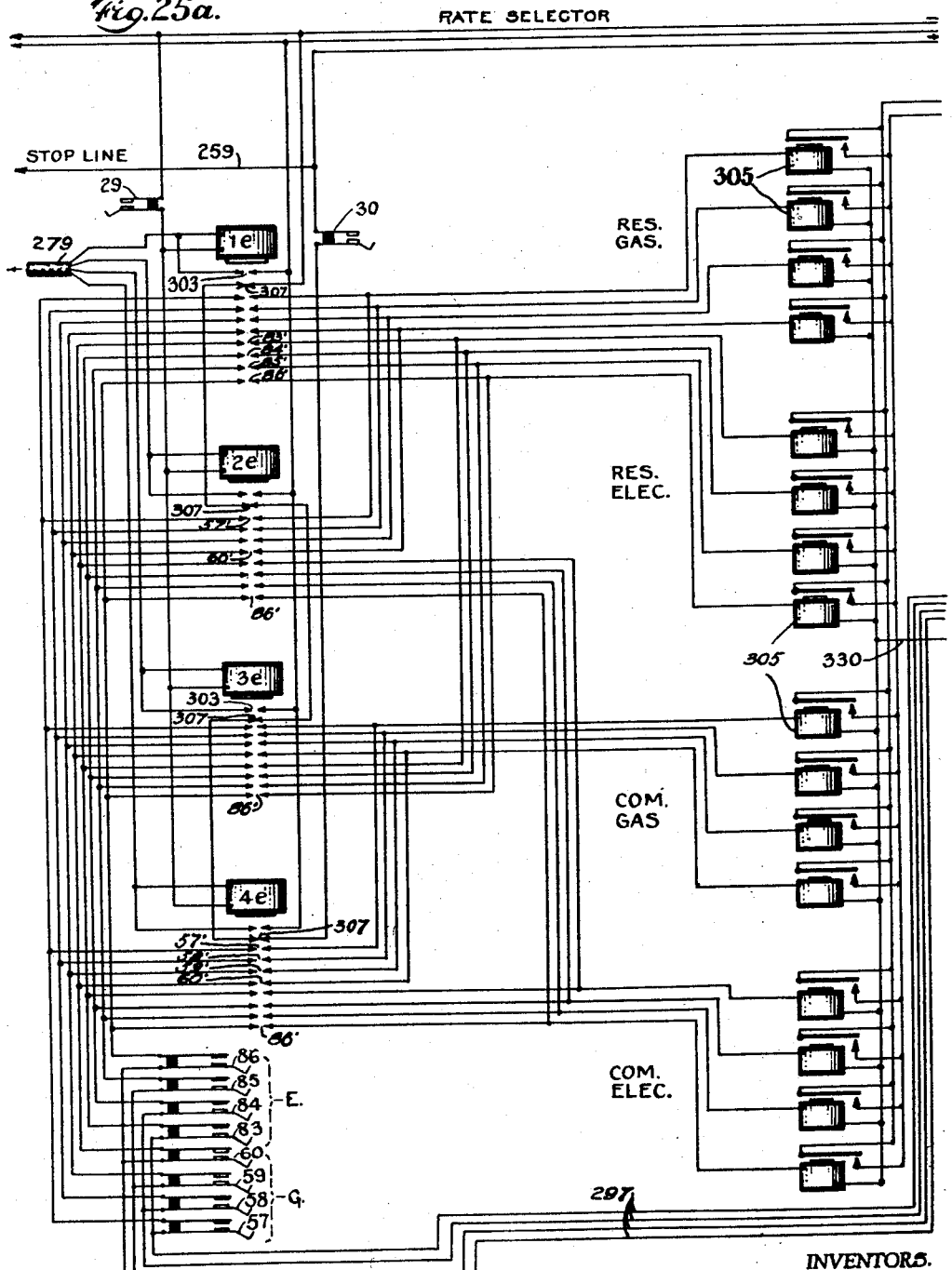

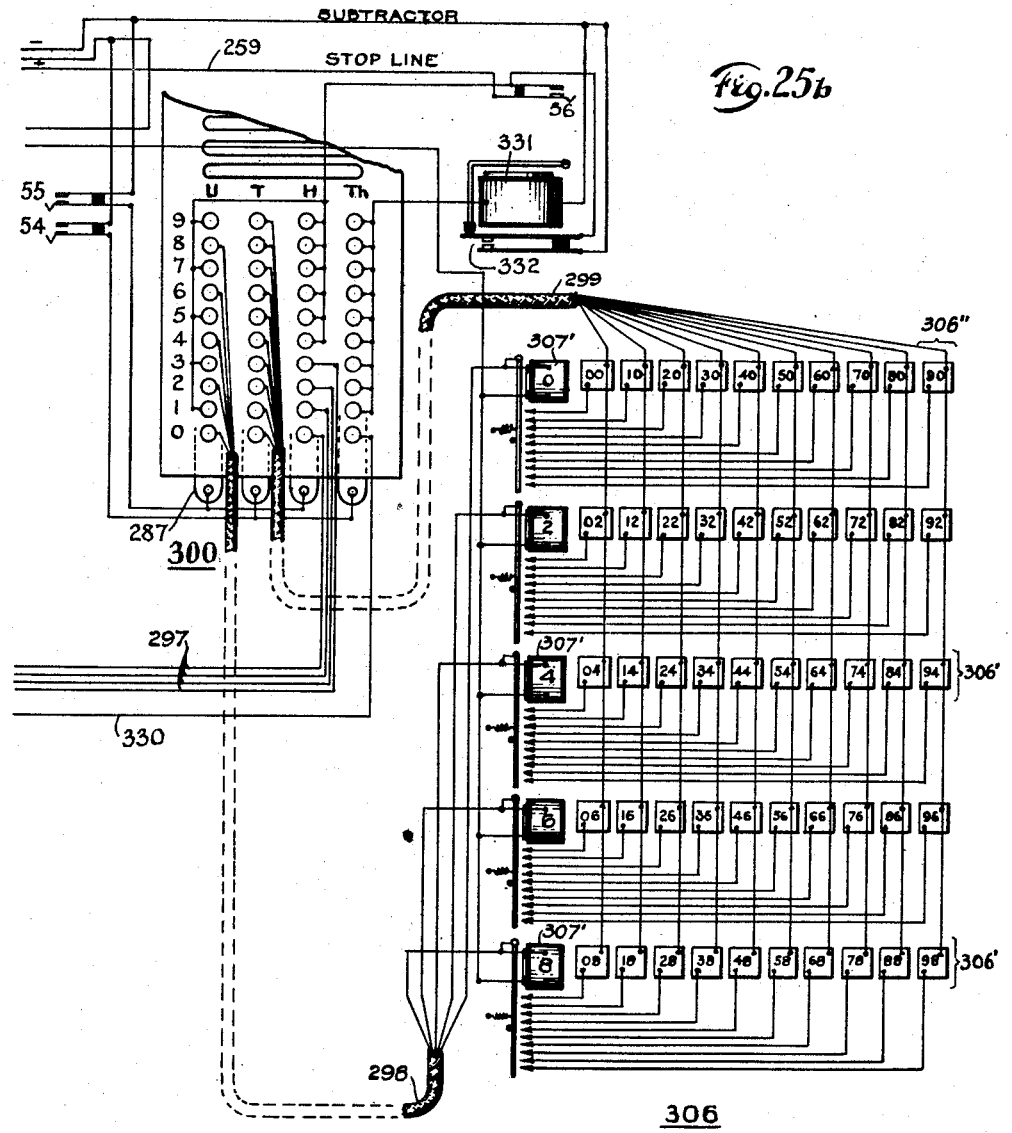

Jan. 13, 1948.　　W. LEATHERS ET AL　　2,434,500
ACCOUNTING MACHINE
Filed June 14, 1945　　13 Sheets-Sheet 12
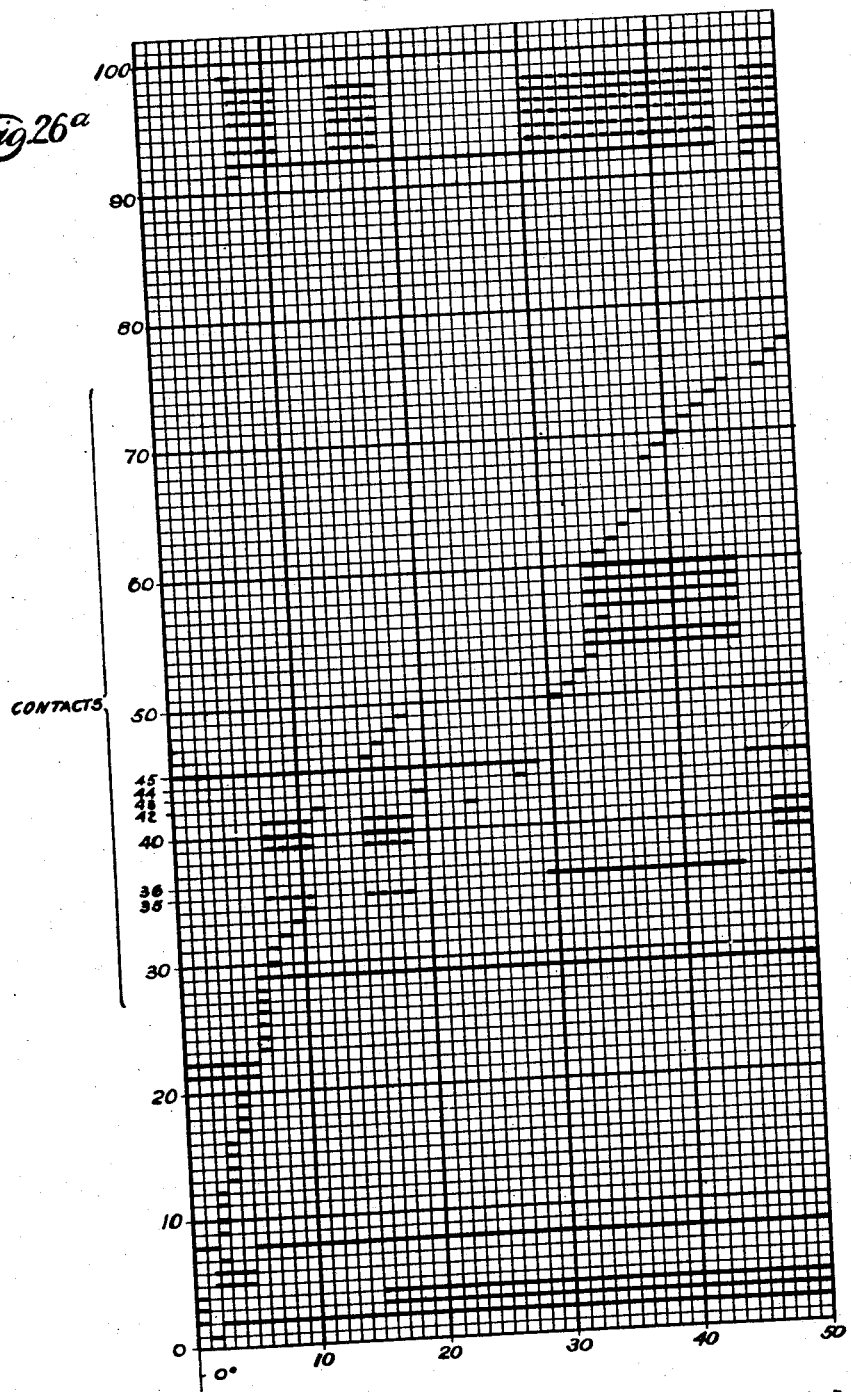
INVENTORS:
Ward Leathers,
Jerrier Haddad.
BY
ATTORNEY.

Patented Jan. 13, 1948

2,434,500

UNITED STATES PATENT OFFICE 2,434,500

ACCOUNTING MACHINE

Ward Leathers, Brooklyn, and Jerrier Haddad, Ithaca, N. Y., assignors to International Business Machines Corporation, New York, N. Y., a corporation of New York Application June 14, 1945, Serial No. 599,420

4 Claims. (Cl. 235—61.8)

This application is a continuation-in-part of our co-pending application, Serial No. 483,880, filed April 21, 1943, now Patent No. 2,393,386, for an Accounting machine.

The improved accounting machine comprising the present invention is primarily adapted for use in connection with the joint billing of metered commodities, such as gas, electricity, water and the like, and has for its principal object the provision of a machine which will accurately and economically compute and record by means of perforations on a suitable record media, such as telegraphic tape, the necessary pertinent data for the joint billing of two or more of these commodities.

According to the present invention, where two or more public utility commodities are jointly billed under a single individual account, the primary data consisting of an account number, a rate character, and previous and present meter readings are recorded on telegraphic tape according to a selected code and forms the basis for computation of the billing data. This primary or initial data may be obtained by telemetric methods, such as are shown and described in United States patents to Ward Leathers, Nos. 2,283,070; 2,283,071; 2,285,819; 2,304,698 and 2,314,719, all of which relate to Meter reading apparatus, or it may be compounded each month from the hand written data in a meter reader's account book.

The billing data for electricity may consist of the account number, the rate character, the present and previous months' meter readings, the consumption during the billing period (i. e. the difference between the two readings), the fuel adjustment, which may be added to or subtracted from the charge, the tax which is derived from the sum of the charge and the fuel adjustment, and a total figure representing the total money sum to be paid for electricity. The billing data for gas may be similarly set forth.

The billing data, of course, varies according to the individual requirements of the different utility companies in such matters as, for example, gross and net amounts and other required figures. The present accounting machine has, for illustrative purposes, been shown in connection with the joint billing of gas and electricity and makes provision for recording the meter readings, both as regards gas and electricity, for subtracting the later readings from the respective earlier readings and for recording the consequent consumption figure.

The consumption figure thus attained is employed to select a predetermined money figure computed according to an established rate, as evidenced by the rate character of the primary data and the selection is made from a series of figures which are manually set into an electrical data storing device from which the required figures may very rapidly be removed by electrical means. Other additional figures representing money values may also be set into the electrical data storing device and selected therefrom for computation purposes. The data storing device above referred to has been diagrammatically illustrated herein and reference may be had to a patent to Ward Leathers and Archibald Gold, No. 2,314,718, dated March 23, 1943, for Accounting apparatus, for a full disclosure thereof.

In the embodiment of the invention illustrated herein, the additional figures above referred to consist of fuel adjustment charges, tax charges and total charges, all of which are simple functions of the charge amount and which may be precomputed in any suitable manner and set into the data storing device. Since there are several billing rates or classifications for each utility, such as commercial gas, residential electricity, etc., the capacity of the data storing device must be sufficient to accommodate the storing of the required information for each of these rates.

An important feature of the invention resides in the provision of the rate character on the primary tapes, i. e. the perforated tape representing data for the current month or period and the tape representing data for the previous month or period. This rate character is an integral part of the meter readings and in the machine it serves automatically to select the correct portion of the data storing device to elicit the proper data according to the current rate.

Another feature of the invention resides in the use of a special character on the primary tapes whereby special circumstances frequently encountered in public utility accounting are accommodated. For example, if a consumer discontinues an account, or if a consumer opens an account during the billing period, a reading for that account is entered on one of the primary tapes but not on the other. In order to keep the sequence of the account readings on the two tapes correct, a special notation must be made beforehand to inform the operator of the machine that the omission of a reading on one tape is proper and is not a mistake caused by negligence or otherwise. On the other hand, if, within a billing period, an account is closed and then reopened, readings will appear on both tapes. In this case, two separate bills are made out with the mid-billing period reading as a common reading. In other words, the common reading constitutes in effect last month's billing for the new consumer and this month's billing for the old consumer. In this case, a special type of card is employed by the operator to stop the sequence of operations temporarily at the proper time by insertion of the card into the machine at a time prior to the processing of the account.

A still further important feature of the invention is the verification of the two primary tapes to insure the fact that the data appearing thereon is related to only one account. According to the invention, if the two tapes do not verify, the machine will automatically stop. If the two tapes do verify with each other and also verify with the special card injected into the machine by the operator (signifying a closed and reopened account), the machine will automatically stop in spite of the first verification.

A further feature of the invention is the ability of the machine to compute billing data from any one of many different rates as automatically chosen by the rate character, which is part of the primary data and which differs according to the classifications and conditions attached to the individual accounts.

Yet another feature of the invention is the ability of the machine to tabulate billing data properly where an account is concerned with only one of the two commodities, i. e. electricity or gas alone. In such an instance, when the billing data is tabulated on the billing tape, a special character is perforated in that portion of the tape relating to the commodity not employed. This is done to keep the relative positions of the various items on the tape correct and to thereby make automatic reading of the information possible.

Another feature or object of the invention is the provision of a machine which will automatically stop its operation when the data for a certain consumption of a commodity is not posted in the data storing device. This condition, although extremely rare, may occur when the consumption is above the capacity of the consumption data storing device or where an odd-numbered figure of consumption data occurs. It is general practice in public utility accounting to bill for only even-numbered figures of consumption.

A further object of the invention is, in a machine of this character, the provision of automatic means for advancing the two primary data bearing tapes through the machine for sensing purposes. The tapes are advanced after all information needed from them is used and during that portion of the machine cycle when the data storing device is being used. In this manner no lost motion or idle time is encountered.

Still another object of the invention is the provision of a master timing device which is motor driven and which initiates all automatic operations by controlling the opening and closing movements of numerous pairs of electrical contacts in timed relationship with required machine functions. A related object is the provision of such a timing device which will permit of exceedingly fine adjustment, as far as timing operations are concerned.

Another object of the invention is the provision of electrical circuits which operate to insure continuity of operation of the machine during a complete accounting cycle, yet which will automatically cause the machine to stop at the end of a cycle when the proper automatic signal is given for the machine so to stop.

A further object of the invention is the provision of means whereby the machine will indicate the billing of a minimum charge by the substitution of a special character in lieu of the hundreds digit of the charge on the billing tape.

A still further object of the invention is the provision of means for indicating billings that are made by average readings when a meter reader is unable to enter a premise and read the meters therein.

A further object of the invention is the provision of means for preventing false characters from being perforated on the billing tape.

The provision of a machine of this character, which is comprised of a minimum number of moving parts, such as relays, rotary timing devices and the like, and which consequently is unlikely to get out of order; one which, considering its usefulness, is not costly; one which is relatively simple in its operation and does not require highly skilled labor for its operation, and one which otherwise is well adapted to perform the services required of it, are further desirable features that have been borne in mind in the production and development of the present invention.

Other objects of the invention will be pointed out in the following description and claims and illustrated in the accompanying thirteen sheets of drawings, which disclose, by way of example, the principle of the invention and the best mode, which has been contemplated, of applying that principle.

In the drawings:

Figs. 1a and 1b, taken together, represent a block diagram of the large units of the machine and show the means whereby these units are interconnected.

Fig. 2 is a fragmentary view of a strip of tape perforated according to a four line code and illustrating the code.

Fig. 3 is a fragmentary view of a strip of typical perforated tape showing one complete account.

Fig. 4 is a similar view showing the same account one month later.

Fig. 5 is a fragmentary view of a strip of typical billing tape developed from the primary tape strips of Figs. 3 and 4.

Fig. 6 is a diagrammatic view of a tape number verifier employed in connection with the present invention.

Fig. 7 is a diagrammatic view of a decoding device employed in connection with the invention.

Fig. 8 is a diagrammatic view of a coding device also employed in connection with the invention.

Fig. 9 is a diagrammatic view of a perforating device employed for recording purposes.

Fig. 10 is a plan view, partly in section, of a sensing device employed in connection with the invention.

Fig. 11 is a side elevational view, partly in section, of the sensing device shown in Fig. 10.

Fig. 12 is a fragmentary side elevational view of a more or less conventional subtracting device employed in connection with the invention and showing certain electromagnetic operating means therefor.

Fig. 13 is a diagrammatic view of an electrical adapter for actuating the subtracting device of Fig. 12.

Fig. 14 is a front elevational view of an electrical transmitter employed in connection with the subtracting device.

Fig. 15 is a top plan view, partially diagrammatic in its representation, of the adding and subtracting device shown in Fig. 12.

Fig. 16 is a fragmentary perspective view of a portion of the data storing device showing the manner in which precomputed data is manually set up.

Fig. 17 is a perspective view of a data storing clip employed in connection with the data storing device.

Fig. 18 is a schematic view of the data storing device.

Fig. 19 is a plan view of an account card adapted to be inserted in the machine when a new account is encountered.

Fig. 20 is a plan view of a similar card adapted to be inserted in the machine for an account which is to be billed at a rate different from the usual rate.

Fig. 21 is a plan view of another card adapted to be inserted in the machine when an account is to be billed on an average reading basis.

Fig. 22 is a plan view of another card employed in connection with a discontinued account.

Fig. 23 is a fragmentary plan view of a cross bar selecting mechanism employed in connection with the data storing device.

Fig. 24 is a detailed, fragmentary, perspective view of a portion of the cross bar selecting mechanism of Fig. 23.

Fig. 25a is a diagrammatic view of a rate selector and level selector employed in connection with the cross bar selecting mechanism of Fig. 23.

Fig. 25b is a similar diagrammatic view and represents a continuation of Fig. 25a, and Figs. 26a and 26b, taken together, and arranged in end-to-end alignment, represent the timing device of the machine throughout one complete machine cycle.

In all of the above described views like characters of reference are employed to designate like parts throughout.

*General description*

Figure 1A:
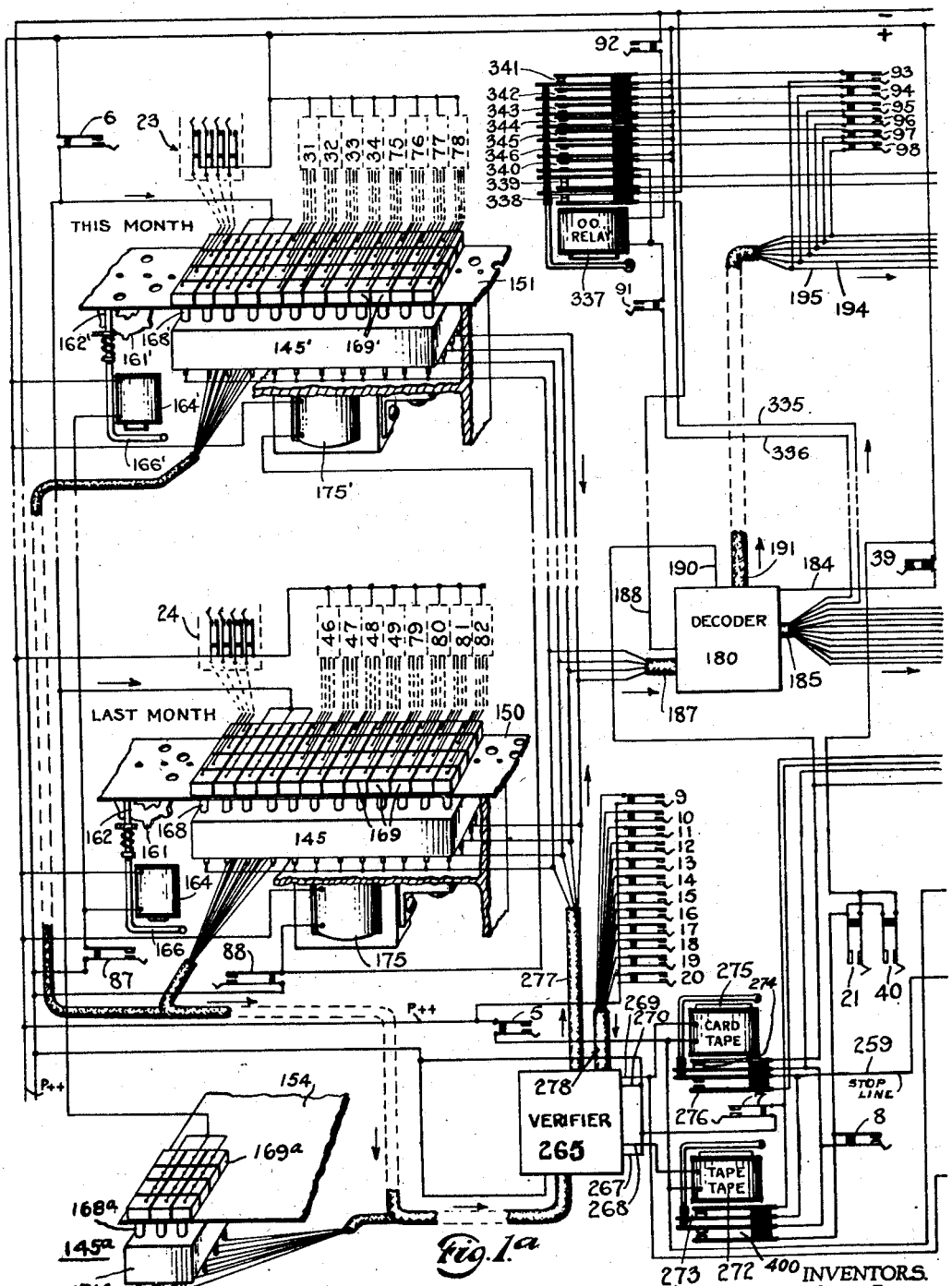

The invention is predicated upon the fact that a utility company may distribute both gas and electric service, billing for the same simultaneously under a single account number for each customer. Accordingly, the primary information for calculating the billing data for both gas and electricity appears in the form of perforations on two strips of tape 150 and 151, shown in Figs. 3 and 4 respectively, and hereinafter referred to as the primary data tapes, or simply as the primary tapes. The data appearing on the tapes 150 and 151 may be obtained by a telemetric system of meter reading or it may be obtained by actual inspection of the meters in the usual manner of public utility accounting. Irrespective, however, of the manner in which the meter reading data is obtained, the essential features of the invention are at all times preserved. The data appearing on the two primary tapes 150 and 151 is processed by the apparatus and a third tape 152, shown in Fig. 5, hereinafter referred to as the billing data tape, is perforated in accordance with the information appearing on the tapes 150 and 151.

The information appearing on the primary data tapes 150 and 151 is in the form of a selected telegraphic code, such as is shown in Fig. 2. The code employed herein, for illustrative purposes, is a four line code with a capacity for fifteen characters and a blank space. Only twelve of these characters are employed, however, ten to represent the digits 0 to 9 and two special characters for certain designated purposes which will be set forth subsequently.

The character "⊗" consists of a complete row of four perforations in the same index point position of the tape and is used for a dual purpose. The billing data tape 152 of Fig. 5 is, in the last analysis, the output data bearing media of the present accounting apparatus. It is adapted to be employed when removed from the machine to operate a suitable bill printing mechanism. In such an instance the character ⊗ operates to render the printing mechanism inoperative to print insignificant zeros appearing in money values. The character ⊗ is not employed on either of the primary tapes and insignificant zeros appearing either on the primary tapes or on the billing data tape are perforated in the usual manner. As a consequence on the printed bill obtained by an extraneous processing of the billing data tape, these insignificant zeros are included. Thus an account number will read 065 or a consumption of 34 kw.-hr. will appear as 0034, but a charge of $2.56 will appear on the tape as ⊗2.56. This character operates to prevent these zeros from being printed on the consumer's bill. The billing data tape is divided into successive accounts, each account comprising fifteen fields which, considered collectively, consume fifty-three index point positions. Two spaces are left on the tape between consecutive adjacent accounts. Thus, if the spaces for insignificant zeros were omitted altogether, the tapes could not be tabulated in their proper relative positions. If these spaces were left blank they would be mistaken for the blank spaces left between successive accounts and confusion would result in either case.

The character M is employed to identify a minimum charge. It is perforated on the billing tape 152 in place of the tens digit of a money figure and is followed by the perforation of the amount of the minimum charge. For example, if the minimum charge is ninety cents, the character M will be followed by the code representation 0.90 and the final printed bill will show M 0.90.

On each of the primary data tapes 150 and 151 a single account is represented by four fields involving twelve index point positions. The first character recorded is a complete field in itself and may represent the rate at which the bill for that account should be computed. In the present instance, provision is made for four different rate combinations, each including a rate for gas and a rate for electricity.

The next three characters constituting the second field may represent the individual account number. In the present instance, only three digits are employed to identify a single account. Each reel of primary data tape may, for convenience, contain a group of one-thousand accounts.

The next four characters are employed to represent the gas meter reading. This reading is cumulative and a previous recording of a reading must be subtracted from it to get the proper consumption figure for a billing period on the billing tape 152.

The last four characters are employed to represent the electric meter reading. This reading is likewise cumulative and a previous reading must be subtracted from it to get the proper consumption figure on the billing tape.

As previously stated, the data which appears on the two primary tapes 150 and 151 is processed and the billing data tape 152 is perforated in accordance therewith. The billing tape 152 in its final form, includes all the data necessary for billing an account for the commodity or commodities consumed by the holder of different accounts, this material occurring on the billing data tape in corresponding tabular positions. This data is the elementary data required for billing purposes by every account. If any special or extraneous data is required for billing, it will be derived from other sources, as for example, an additional tape (not shown) which may be called a "special items" tape. The name and address of an account holder must obviously be present on a bill. This information may be present on a pre-addressed bill or it may be derived from an additional perforating tape termed a "master tape." The billing data tape, the "special items" tape and the "master tape" may then be used for the printing of a complete bill by means of a telegraphic tape tabulating or printing machine. The present apparatus, however, pertains only to the preparation of the billing data tape shown in Fig. 5.

Tape verification

The billing data appearing on the tape 152 is recorded in sequential order along the tape and is initiated by the perforation of the three identifying numbers of the account in the first field of the tape. These identifying numbers are the same as the three identifying numbers appearing on each of the tapes 150 and 151 in the second field thereof. It is perforated in the first field of the tape 152, however, inasmuch as it must be verified on the tapes 150 and 151 before anything may correctly or safely be perforated on the billing data tape. The tapes 150 and 151 are advanced through the sensing unit, shown in Fig. 11, simultaneously. If for any reason these two tapes fail to advance in unison and the relative positions of the tapes become misaligned, or if for any reason an account is dropped from, or added to, one of the tapes and not to the other so that the tapes are not at all times offering information for the same account for computation, the machine will automatically stop without perforating a single character on the billing data tape 152. Additionally, it is desirable that the machine stop if the two account numbers on the tapes 150 and 151 verify with each other and also verify with a number appearing on a special card 154, such as is shown in Fig. 19, representing the opening of a new account and which is injected into the machine for verification purposes. Thus, the machine will proceed to perforate the tape 152 when, and only when, the account numbers appearing in the second field of the tapes 150 and 151 agree with each other but do not agree with the account number appearing on the special card 154.

The operator of the machine must be informed of all special conditions associated with the primary data tapes. These conditions may be caused by a consumer opening an account or closing an account. Often one consumer will close an account and a different consumer open the same account within a billing period. Special bills must be made out in each of these cases for the services of the utility during the particular fractions of the billing periods. Such bills are not cared for by the apparatus in this embodiment of the invention. These bills will be calculated and prepared manually by the bookkeeping department of the utility company. In such event, the information on the primary data tapes relating to the special bills must be removed by the operator and forwarded to the bookkeeping department. The operator must also reestablish the positions of the primary data tapes in the machine so that they offer the very next account for processing. To do this, the operator may either copy down the necessary data appearing on the tapes for forwarding and thereafter advance the tapes to the beginning of the next account, or he may sever fragments of the tapes and remove the same from the machine for forwarding, thereafter resorting to a splicing operation to restore the tapes to their proper relative positions.

In cases where an account is closed during a billing period, a card, exemplified by the card 155 in Fig. 22, is prepared and given to the operator. In cases where an account is opened during a billing period, a card, exemplified by the card 154 in Fig. 19, is prepared and given to the operator. The operator is thus informed of all out-of-the-ordinary conditions of the primary data tapes that are not due to errors in the compounding of these tapes.

Therefore, when an account is closed during a billing period, there will be no reading on this month's primary data tape to verify with the old reading. The machine will automatically stop, and the operator will check the account number on last month's tape against a closed account card, similar to the card 155; take all information needed pertaining to that account from the tape and record it on the card, and finally advance last month's tape until the following account is in position for processing. The machine may then resume operation.

When an account is opened during a billing period, there will be no reading on last month's primary data tape to verify with the new reading. The machine will automatically stop, and the operator will check the account number on this month's tape with a new account card, similar to the card 154; take all information needed pertaining to that account from the tape and record it on the card; advance this month's tape until the following account is in position for processing; replace the new account card just used with the one that will next be used, and start the machine running automatically again. If an account is closed and then reopened during the same billing period, the machine will stop because the account number perforated on the new account card which is injected into the machine will verify with the account numbers on the two primary tapes. In such a case, the operator will check the account number against a closed account card and the new account card; take off all information needed and record same on the cards; advance both tapes until the following account is in position for processing; replace the new account card with the next new account card, and, finally, start automatic operation of the machine.

After the verification processes have been concluded, the account number, consisting of three digits, is automatically perforated on the billing data tape 152 in Fig. 5.

Rate characters

The fourth numeral in the second field of the billing tape 152 is the rate character. This character appears in the first field of the primary tapes 150 and 151. In this embodiment of the invention, gas and electric charges may be taken from either residential or commercial rates. Thus, there are four combinations of two rates each for each account that has both gas and electric service. Each of the four combinations of rates has its own rate character. Thus, for example, when an account has rate character "one," it will be billed according to residential gas and residential electric rates. If the rate character is "two," it will be billed according to residential gas and commercial electric rates. If the rate character is "three," it will be billed according to commercial gas and residential electric rates. If the rate character is "four," it will be billed according to commercial gas and commercial electric rates. At the same time that the rate character is perforated on the billing tape 152, it sets up the rate selector shown in Fig. 25a. If the rate under which the account was billed last month is not the same as the rate to be used for the same account this month, the machine will automatically stop, as will be explained later. In such cases, the operator is informed of the changed condition by a rate change card, exemplified by the card 156, shown in Fig. 20. The operator records all pertinent information from the primary tapes on the rate change card; advances both primary tapes until the next account is in position for processing; puts the special character "⊗" on the billing tape in place of the regular billing information in order to retain tabular position, and then starts the machine running automatically again.

Gas billing

The "fifth," "sixth," "seventh" and "eighth" characters in the third field of the billing data tape are the four digits representing this month's gas reading. While these figures are being perforated on the billing tape, they are also injected into an electrically actuated subtracting machine 157, in Figs. 12 and 15.

The "ninth," "tenth," "eleventh" and "twelfth" characters in the fourth field of the billing data tape are the four digits representing last month's gas reading. While these figures are being perforated on the billing tape, they also are automatically injected into the subtracting machine 157, shown in Figs. 12 and 15.

Last month's gas reading is then subtracted from this month's gas reading by the subtracting machine 157. The remainder represents the consumption of gas in hundreds of cubic feet. The gas consumption is then perforated on the billing data tape as the "thirteenth," "fourteenth," "fifteenth" and "sixteenth" characters in the fifth field thereof.

While the gas consumption is being perforated on the billing tape, it is also used to select a set of precalculated figures set into the data storing device 158 (see Fig. 1b). These precalculated figures are then perforated on the billing data tape. The first four figures represent the basic charge for the amount of gas consumed and the "seventeenth," "eighteenth," "nineteenth" and "twentieth" characters on the billing data tape representing the sixth field are reserved for this information. The next three figures represent the tax to be paid on the charge and are perforated in the seventh field as the "twenty-first," "twenty-second" and "twenty-third" characters of the billing data tape. The last four figures represent the total charge for gas and are perforated in the eighth field as the "twenty-fourth," "twenty-fifth," "twenty-sixth" and "twenty-seventh" characters on the billing data tape.

Electric billing

The "twenty-eighth," "twenty-ninth," "thirtieth" and "thirty-first" characters in the ninth field of the billing data tape represent this month's electric reading. While these figures are being perforated on the billing tape, they are also injected into the subtracting machine 157 of Fig. 12.

The "thirty-second," "thirty-third," "thirty-fourth" and "thirty-fifth" characters in the tenth field of the billing tape represent last month's electric reading. While these figures are being perforated on the billing tape, they are also injected into the subtracting machine 157 in Fig. 12.

Last month's electric reading is then subtracted from this month's electric reading by the subtracting machine 157. The remainder represents the consumption of electricity in kilowatt-hours. The electric consumption is then perforated on the billing tape in the eleventh field thereof as the "thirty-sixth," "thirty-seventh," "thirty-eighth" and "thirty-ninth" characters.

While the electric consumption data is being perforated on the billing tape, it is also used to select a set of precalculated figures set into the data storing device 158 of Fig. 1b. These prevalculated figures are then perforated on the billing tape. The first four of these figures represent the basic charge for the amount of electricity consumed, and are perforated in the twelfth field as the "fortieth," "forty-first," "forty-second" and "forty-third" characters on the billing tape. The next three figures represent the fuel adjustment charge and are perforated as the "forty-fourth," "forty-fifth," and "forty-sixth" characters in the thirteenth field of the billing tape. The next three figures represent the tax to be charged on the adjusted basic charge and are perforated as the "forty-seventh," "forty-eighth" and "forty-ninth" characters in the fourteenth field of the billing tape. The last four figures represent the total amount to be charged for electricity and are perforated as the "fiftieth," "fifty-first," "fifty-second" and "fifty-third characters in the fifteenth or last field of the billing data tape.

The billing data tape is then advanced two spaces. These spaces serve to separate the billing data of adjacent or succeeding accounts.

After last month's electric reading is injected into the subtracting machine 157, the two primary data tapes are no longer needed for any information pertaining to the account being processed. Therefore, while the pre-set figures are being removed from the data storing device, the two primary data tapes are advanced until the next account is in position for processing. This prevents lost motion and conserves the time needed by the machine to run through a complete cycle.

After the two primary tapes have been completely processed, last month's primary tape may be disposed of or filed for record purposes. This month's tape must be used during the next billing period, however, and becomes last month's tape at this time.

The tape sensing mechanism

Referring now to Figs. 10 and 11, and also to Fig. 1a, the sensing mechanism for the tapes 150 and 151 is designated in its entirety at 145, 145'. The two primary tapes 150 and 151 are each provided with a series of longitudinally extending, centrally arranged drive hole perforations 160, by means of which they are advanced through their respective sensing mechanisms 145 and 145' in side-by-side relationship. The sensing instrumentalities for each of the tapes 150 and 151 are substantially identical in construction and it is thought that a description of one of these sets of instrumentalities will suffice for the other. Accordingly, similar characters of reference have been employed to designate the corresponding parts of the two sets of instrumentalities.

The sensing mechanism includes a stationary framework 174 in which the two sets of sensing instrumentalities are commonly housed. The sensing instrumentalities for the tape 150 include a rotatably mounted drive wheel 161, having drive pins 167 arranged in spaced relationship about the periphery thereof for registry with the perforations 160 in advancing the tape through the sensing mechanism. The drive wheel 161 is adapted to be periodically indexed by means of a pawl and ratchet mechanism 162, 163, the operation of which is controlled by means of an electromagnet 164. It will be seen that upon energization of the magnet 164, the pawl 162 associated therewith will be retracted and upon deenergization of the magnet the pawl will perform its operative stroke under the influence of a spring 165, thus advancing the drive wheel 161 and causing the tape to be pulled through the sensing device.

Inasmuch as each account appearing on the primary tapes 150 and 151 comprises twelve index point positions, and inasmuch as there are two blank spaces between each account on the tapes, provision must be made for periodically advancing the two tapes simultaneously through the sensing apparatus 145, 145', to the extent of fourteen index point positions at one tape advancing operation during each machine cycle. Toward this end, energization of the electromagnet 164 is controlled by a pair of normally open timer-controller contacts 87 (see Fig. 1a) which may operate from the timer device to become momentarily closed fourteen times in succession during the proper portion of the machine cycle.

Still referring to Fig. 11, a plurality of metallic sensing pins 168 are located directly beneath each index point position of the tape 150, while a cooperating metallic bar 169 is located directly above each index point position in cooperating registry with one of the sensing pins 168. The bars 169 are set into an insulating block 170 rigidly supported in the framework 174 of the apparatus. Each individual sensing pin 168 is supported in an insulating block 171 in the form of a floating cradle which is normally urged upwardly by means of a pair of springs 173. Each sensing pin 168 is normally urged upwardly into engagement with its respective bar 169 by means of a spring 172. An electromagnet 175, suitably supported on the framework 174, is provided with a plunger 176 pivotally secured to the cradle or block 171, and upon energization of the magnet 175 the entire cradle is lowered in the framework 174 in order that the various pins 168 may clear the tape and permit the latter to be advanced through the senser.

*The card sensing mechanism*

The card sensing mechanism is designated in its entirety at 145a in Fig. 1a, wherein it is shown in perspective. The card sensing mechanism 145a is adapted to receive and sense the various special account cards, such as the card 154, representing a new account, as shown in Fig. 19, or the card 177, representing an average bill, as shown in Fig. 21. The sensing mechanism 145a is somewhat similar in its design and operation to the sensing units which cooperate to make up the sensing mechanism 145, 145', for sensing the primary tapes. Accordingly, similar reference characters are applied thereto. The mechanism is shown more or less diagrammatically in Fig. 1a and includes a plurality of upper sensing bars 169a and lower cooperating sensing pins 168a, the latter being carried in an insulating block 171a. The sensing pins 168a are normally urged upwardly into engagement with the sensing bars 169a by means of coil springs (not shown) similar in function to the springs 172. The special account cards are formed of relatively thick cardboard and these cards are adapted to be manually inserted in position in the sensing device 145a. As a consequence, no advancing mechanism is required, nor is there any necessity for lowering the block 171a to cause the pins to clear the card when the card is inserted into or removed from the apparatus. If desired, the upper ends of the sensing pins may be rounded to provide a camming action when the card is inserted into the apparatus.

*The decoder*

Referring now to Fig. 7, after the tapes 150 and 151 have been sensed by the apparatus shown in Figs. 10 and 11, such information as is not directly transferred electrically to the perforating device of Fig. 9 for immediate application to the tape 152 is decoded into the decimal system by means of a decoder 180. For the decoding of a single character, a combination of one or more of the four perforations of the code causes a plurality of electrical circuits to be established, which in turn serve to close one or more of a series of electromagnets 181, labeled individually 1a, 2a, 3a and 4a, and hereinafter referred to as decoder input magnets. When these latter electromagnets become closed, they in turn serve to close one of a series of electromagnets 182, individually labeled ⊗b, 0b, 1b, 2b, 3b, 4b, 5b, 6b, 7b, 8b and 9b, hereinafter referred to as decoder output electromagnets. Although there are fifteen separate combinations of the decoder input electromagnets 181 that may be energized, only eleven of these combinations are employed. The decoder 180 is of the well-known Baudot type and a relatively brief description thereof is deemed to be sufficient in the present instance. The various output electromagnets 182 are adapted to be individually and selectively energized through a labyrinth system of Baudot type contacts, collectively designated at Cb, which are adapted to shift their positions upon energization of their respective decoder input electromagnets 181 and which, when shifted from one position to another, or when allowed to remain in their normal positions, as shown, serve to reroute current through the labyrinth circuit to a selected individual electromagnet of the series 182. Each of the decoder output electromagnets 182, except the magnet labeled ⊗b, is provided with a pair of contacts 183, which contacts are normally open but are adapted to become closed upon energization of their respective magnets. The pairs of contacts 183 have one terminal arranged in common as at 184, while the other terminals thereof are grouped together and passed through a cable 185. The electromagnet labeled ⊗b is provided with a pair of contacts 186. Each of these latter contacts is connected to wires that are passed through the cable 185.

The four input electromagnets 181 are adapted to be energized by means of electrical circuits leading from a cable 187, and by means of a common wire 188. These electromagnets 181 are at times employed as intermediate relays in order that the sensing unit pins 168 shall not be obliged to operate a device requiring heavy current, as for example, the perforator shown in Fig. 9. Pairs of contacts 189 associated with each of the electromagnets 181 have one terminal thereof led in common to a wire 190 and the other terminal thereof led out through a cable 191. Additional pairs of contacts 192 and 193, associated with each of the electromagnets 181, have one terminal connected to the common wire 190, while the other terminals are led out through the cable 191 by means of a common wire 194. The contacts 193 have terminals which are led out through the cable 191 by means of a common wire 195.

The coder

The coder is designated generally at 200 and is best illustrated in Fig. 8. The object of the coder 200 is to translate a single current impulse into a combination of one or more of four current impulses, according to the particular telegraphic code previously described. Briefly, the function of the coder is precisely the reverse of that of the decoder 180 shown in Fig. 7. Current flowing through any one of the twelve wires comprising the cable 201 will cause a corresponding electromagnet 1d, 2d, 3d, 4d, 5d, 6d, 7d, 8d, 9d, 0d, ⊗d or Md to operate a bank of contacts associated with each of the above described electromagnets and will cause one or more of a series of wires 202, 203, 204 or 205 to become connected to a common wire 206 upon selective energization of the electromagnets. Each electromagnet represents a character and each connects the aforementioned wires to the common wire in such a manner as to actuate the perforator of Fig. 9 and cause the same to perforate the tape to represent the telegraphic code character corresponding to the original character that was to be coded. in a manner that will be set forth presently. Each electromagnet, upon energization, also serves by operation of its respective bank of contacts to connect a pair of wires 207 and 208 to the common wire 206. The current flowing in the circuit thus closed when the wires 207 and 208 are connected to the wire 206, serves to advance the tape which is being perforated under the control of the coder in much the same manner as the tapes 150 and 151 of Figs. 10 and 11 are advanced. utilizing a center drive hole punch magnet DH and a ratchet drive magnet D.

A wire 209 affords a common connection for the various magnets of the coding device and has interposed therein a normally closed pair of contacts 339. the function of which will be set forth hereinafter. It is evident that when the pair of contacts 339 become opened, none of the coder magnets can be energized.

The perforator

Referring now to Fig. 9, the perforating mechanism which operates upon the tape 152 is designated in its entirety at 220 and serves to perforate in the tape such information as is directly translated from the tapes 150 and 151 or as is relayed to the coder and then translated to the perforator in the selected code.

The tape 152 passes beneath a die block 222 and is operated upon by means of a plurality of punches 223, 224, 225 and 226, which are arranged in alignment in a direction transversely of the tape. Each of the various punches is adapted to be forced upwardly through the tape 152 and into the die block 222 when a respective electromagnet 1c, 2c, 3c or 4c is energized. A punch 227, operable upon energization of a solenoid DH, serves to apply the center drive hole perforations 160 to the tape. A pawl and ratchet driving assembly 233, similar to the mechanism 162, 163 of Fig. 11, serves to advance the tape 152 upon deenergization of its control electromagnet D, energization of this magnet merely serving to preset the ratchet mechanism. In order to prevent the tape 152 from being advanced while one or more of the various punches are still protruding through the tape, the electromagnet D is normally maintained energized by the locking action of one or more of a plurality of pairs of contacts 228, 229, 230, 231 or 232, which are adapted to become closed upon energization of their respective electromagnets 1c, 2c, 3c, 4c and DH. These pairs of contacts are so adjusted that they open only when their respective punches are fully clear of the tape 152. They are all connected together in parallel and the electromagnet D receives energizing current when one or more of these pairs of contacts are closed. When all of the above mentioned pairs of contacts are opened, the electromagnet D will become deenergized, thus advancing the tape 152 one index point position.

The perforator is adapted to be energized by means of certain electrical circuits carried through a cable 234 (see Fig. 8) or it is adapted to become energized directly from the coder input coils of Fig. 8. Certain timer contacts 22 and 41 (see also Fig. 1b) are associated with the perforator 220 and their operation will be explained hereinafter.

The timing mechanism and its timing chart

Figure 26B:
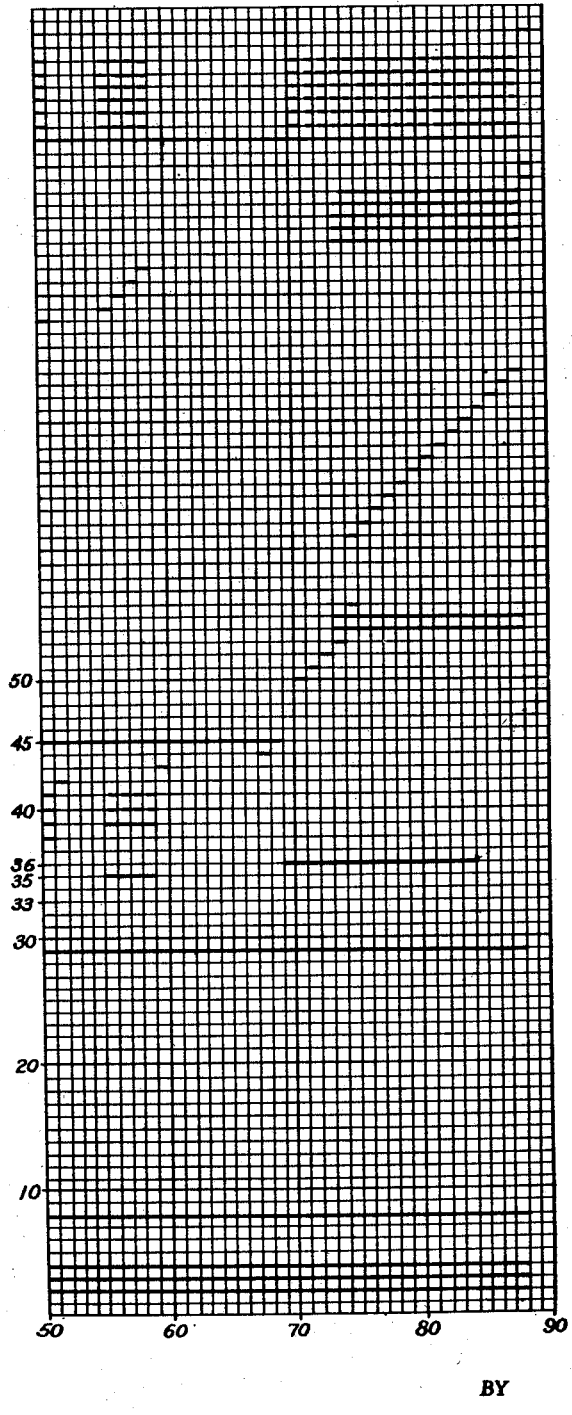

The operation of the machine as a whole and the correlation of the operation of the individual units thereof are controlled by a motor driven timer drum assembly designated in its entirety at 239 in Fig. 1b. This timer mechanism includes a rotary timer drum 240, shown as a fragment in full lines at one point and also as a fragment in dotted lines at another point in this figure. The timer drum 240 serves to open and close a plurality of pairs of contacts in timed relationship, thus forming the basis for full automatic operation of the apparatus. The drum 240 has set into its periphery a plurality of projections, one of which is shown at 241 in full and dotted lines at two points, which projections upon rotation of the drum, engage a plurality of contacts arranged in groups or piles, and one of which is illustrated at 1 as being mounted directly above the drum in the path of movement of the projection 241. Throughout the drawings the various pairs of timer-controlled contacts are illustrated and distinguished from other non-timer-controlled contacts in precisely the same manner as the illustration of the pair of contacts 1, i. e. each of these pairs of timer-controlled contacts on the drawings is supplied with a small V-shaped finger-like projection extending from one of the terminals of the pairs of contacts. The time duration of closure with respect to the rate of rotation of the drum 240 is dependent upon the arcuate extent of the projection 241. The time of closure with respect to a fixed point adjacent the periphery of the drum is dependent upon the positioning of the various projections 241 on the surface of the drum. Thus, both the time at which any of the timer-controlled pairs of contacts become closed and the time duration of closure thereof may be adjusted by adjusting the placement and arcuate extent of the respective projections. For simplicity of illustration, all of the pairs of timer contacts are shown as being located in the individual circuits which they control. It will be understood, however, that all of these pairs of contacts are in reality positioned adjacent the periphery of the drum 240 and are controlled by rotation of the drum. Figs. 26a and 26b may be placed side-by-side in such relative orientation that a single complete chart showing the action of the various timer contacts is represented. On this chart a solid black line represents the interval of time during which the various pairs of timer-controlled contacts are drum-actuated, while the intervening spaces between adjacent solid black lines represents the interval of time during which the various pairs of contacts remain not actuated. The abscissa of this graph represents the time interval, while the ordinate represents the individual pairs of contacts.

When viewing the time chart represented by Figs. 26a and 26b, Figs. 1a and 1b may also be considered. When Fig. 1a is placed to the left of Fig. 1b, the resultant diagrammatic view is a block diagram of the entire apparatus with some of the circuits shown in detail and with others omitted for purposes of clarity. Each complete revolution of the timer drum 240 represents a complete cycle of events in the operation of the machine. The drum 240 is adapted to be driven through a gear reduction device 243 by means of a constant speed motor 242.

*The start-stop electric circuits*

Figs. 26a and 26b, considered jointly, constitute a timer chart for the various machine operations. This chart represents one complete machine cycle. The horizontal abscissa has been divided into ninety index divisions, each representing a corresponding fraction of a machine cycle, while the vertical ordinates represent the respective operations of ninety-nine timer controlled pairs of contacts employed in connection with the present invention. The right-hand edge of Fig. 26a coincides with the left-hand edge of Fig. 26b so that when the two figures are placed side by side along this line of coincidence a complete history of the machine operation is attained.

Unless manual steps are taken to voluntarily cause machine operations to cease, the operation of the apparatus is continuous and repetitious. The starting point for full and significant machine operations commences with the closure of a pair of contacts 1 which occurs, as shown on the diagram, at the beginning of the second machine cycle division or at point 1 in the machine cycle.

Referring now additionally to Figs. 1a and 1b, the right-hand edge of Fig. 1b corresponds to the left-hand edge of Fig. 1a. Electric current leading from a suitable source of power S, which may be an ordinary wall socket connection, is supplied to and disconnected from the apparatus by means of a manually operable knife switch 245 (see lower right-hand corner of Fig. 1b). Closing of the switch 245, however, in itself does not initiate any machine functions or operations but merely serves to make power available at P+ for certain circuit operations which are contingent upon further conditioning operations.

If after closing the switch 245 a second switch 249 in the form of a single-throw locking telephone type of toggle switch is thrown to its "on" position, thus closing the normally open contacts 248, 250 and 254, current will then flow from the line P+ through the pair of contacts 250, now closed, and a pair of normally closed contacts 251 through the timer motor 242 and from thence directly back to the negative side of the line, thus causing the timer drum 240 to rotate. It is important to note at this point that if the switch 245 is closed and the switch 249 is thrown to its "on" position, and if the contacts 251 are closed, the timer motor 242 and, consequently, the drum 240 will rotate, regardless of the open or closed positions of any other pair or pairs of contacts associated with the present machine. As will be pointed out presently, for a short period of time after throwing the switch 249 to its "on" position, reversal of this switch will cause the timer motor 242 to stop. If, however, the motor 242 is allowed to run until such time as the pair of contacts 3 and 4 close at point 15 in the machine cycle, movement of the switch 249 to its "off" position will fail to stop the motor 242 and the timer drum will then continue to rotate throughout the balance of the machine cycle.

Mere rotation of the timer drum upon movement of the switch 249 to its "on" position will be without significance as far as actual accounting machine operations are concerned unless power is also supplied to the line P++. In order to supply power to this latter line, it is necessary that the drum rotate throughout the balance of any left-over portion of a machine cycle and enter upon a brief portion of its next cycle at the beginning thereof, wherein the pair of contacts 1 become momentarily closed at point 1 in the machine cycle. After this has occurred, if for any reason whatsoever machine operations are terminated the drum must again be brought to the very beginning of its cycle and passed through point 1 thereof before normal machine operations can again be commenced.

The negative side of the power line is labeled (—) throughout the drawings and the positive side of the line is variously labeled (+) (P+) or (P++). Immediately upon closing of the pair of contacts 1 at point 1 in the machine cycle with the knife switch 245 closed and the toggle switch 249 thrown to its "on" position, current will pass from P+ through the closed pair of contacts 254, the contacts 1, an electromagnet 247 labeled Start relay, and a normally closed pair of contacts 258 to the negative side of the line. Energization of the magnet 247 initiates a self-locking action due to the presence of a pair of contacts 253 in series with the pair of contacts 248 and the timer contacts 2 in the magnet circuit. After the magnet 247 has become energized and thus locked, power is supplied through a pair of contacts 255, now closed, from the line P+ to the line P++ and is thus available throughout the machine for complete operative functioning thereof. The machine may run indefinitely as long as the switch 245 remains closed and the switch 249 is in its "on" position unless certain contingencies associated with the accounting procedure be encountered thus deliberately causing the machine to stop in a manner and for a purpose that will be made clear presently.

If at any time during the middle of a machine cycle the switch 245 should be opened and left open, the machine will continue to function until the end of the cycle at which time it will automatically stop both as regards the rotation of the drum and as regards the functioning of the various machine operations. Such termination of all machine operations is due to the simultaneous opening of a pair of contacts 3 and 4 at point 1 in the machine cycle. Opening of the contacts 2 is of but momentary duration, while opening of the pair of contacts 3 is for a longer duration. It will be seen that the pair of contacts 254 under the control of the switch 249 are arranged in series with the pair of contacts 1 in the circuit of the magnet 247. Thus, if the contacts 254 are opened by virtue of the switch 249 being in its "off" position, closure of the contacts 1 will be without effect to maintain the start relay energized and if this latter relay be not energized the pair of contacts 255 will be opened so that current will not be available at P++.

It is to be noted that the contacts 2 and 3 become open simultaneously at point 1 in the machine cycle, the former remaining open only until point 2 of the cycle, while the latter, as shown on the diagram, remains open until point 15 at which time it again closes along with the pair of contacts 4. As far as these two latter contacts are concerned, point 15 in the cycle is not critical and an earlier or a later point in the cycle might well be chosen for the reclosing of these contacts. Contacts 1, 2, 3 and 4 function in such a manner that during normal machine operations the start relay 247 will remain energized under the influence of the contacts 1 for the brief period of time that the contacts 2 become open. In other words, the contacts 1 will carry the machine over the gap between points 1 and 2 in the machine cycle where the contacts 2 become open. This latter operation is, of course, contingent upon the knife switch 245 being closed and the toggle switch 249 being in its "on" position. If the former switch is open or if the toggle switch is off at point 1 in the machine cycle, no current will lead to the circuit of contacts 1 and the start relay will, therefore, be deenergized, thus discontinuing current to the motor 242 and allowing the machine to die. The drum 241 will then coast to a stop, which will invariably occur before the contacts 3 and 4 again become closed. On the other hand, if the knife switch 245 is opened or the toggle switch 249 is moved to its "off" position at a point in the cycle later than the point 15, the motor 242 will continue to operate throughout the remainder of the cycle, after which it will stop. The pair of contacts 4 make this latter feature possible, inasmuch as when they become closed at point 15 in the cycle current may flow directly from the P+ line through the contacts 4 to the motor 242 and back to the negative side of the source. The P+ line is maintained energized during the entire length of time that the pair of contacts 3 is closed.

If either the knife switch 245 is open or the toggle switch 249 is "off," opening of the pair of contacts 3 serves to disconnect the line P+ from the source of power and thus deenergize the start relay magnet 247 which, upon becoming deenergized, becomes unlocked so that all of the pairs of contacts controlled thereby become open. Upon opening of the contacts 255, the line P++ becomes disconnected from the already deenergized line P+. The initial deenergization of the line P+ thus immediately serves to discontinue the flow of current to the timer motor and also to the power line P++ for normal machine functions. It also serves to unlock the relay magnet 247 and disconnect the already deenergized line P++ from the line P+.

From the above description it should be clear that opening of the switch 245 at any point along the machine cycle other than at the point 1 will not operate to immediately cease machine operations inasmuch as the pair of contacts 2 operate to maintain the start relay magnet 247 energized. Three conditions are necessary to initiate termination of machine operations. First, the contacts 2 and 3 must open simultaneously at point 1 in the machine cycle and also either the knife switch 245 must be open or the toggle switch 249 must be moved to its "off" position to render the contacts 1 ineffective to maintain the start relay energized.

It will be seen that inasmuch as the pair of contacts 253 serve to lock the relay magnet 247, by means of which they are controlled, and that inasmuch as the local locking circuit, of which they are a part, is not affected by either the switch 245 or the switch 249, the operator of the machine is unable at any time to prevent automatic functioning of the machine while the drum 240 completes an operative portion of a machine cycle. The only manner in which automatic functioning of the apparatus during a portion of a machine cycle where the timer drum 240 continues to rotate can be terminated is, therefore, not at the discretion of the operator but at the discretion of the machine itself, as determined by the proper or improper automatic operation thereof or by regular or irregular accounting contingencies, such as failure to make the previously outline verifying operations, the occurrence of irregular accounts, etc., as will be apparent hereinafter.

In order that automatic functioning of the machine may be terminated by any one of several operating contingencies, which automatically become operable but which are beyond the control of the operator, an electromagnet 252, labeled "Stop relay," is provided and operates when energized to open the pair of contacts 258 contained within the circuit of the magnet 247 to deenergize the latter and disconnect the power line P++ from the source of power, as previously outlined. The magnet 252, when once energized, becomes locked due to the locking action of a pair of contacts 257. Although the pair of contacts 251, controlled by the magnet 252, will become open to disconnect the motor 242 from the power line, current will be supplied to the motor through the pair of contacts 4 until the end of the cycle, and thus the timer drum 240 will continue to rotate during any uncompleted portion of a machine cycle which may be automatically instituted by the machine itself.

A line 259, labeled "Stop line," extends from the magnet 252 to various locations associated with various machine functions and operates when connected to the negative power line to energize the magnet 252 and terminate the machine functions, as previously described. To resume automatic operation of the machine, it is necessary for the operator to open both the switches 245 and 249 and disconnect all source of power from the machine, thus causing the magnet 252 to become unlocked, and only after this is done may the machine be restarted, as previously described.

The verifier

The first operation performed by the machine after the same has been started in the manner just described, is the verification of the account numbers appearing in the second fields of the respective tapes 150 and 151, which represent last month's tape and this month's tape respectively. The account numbers, it will be remembered, are comprised of three digits. The account numbers appearing in the second fields of the two primary tapes are the only numbers which are verified by the machine. It will also be remembered that not only must the two account numbers appearing on the tapes 150 and 151 be verified with each other, but they must be verified with the account number appearing on one of the special account cards 154 or 177, as the case may be, when such cards are inserted in the machine.

The verifier is designated in its entirety at 265 (Fig. 6) and it also appears in Fig. 1a as a block diagram. The verifier is in the form of a more or less elaborate circuit maker and breaker whose function is to selectively energize one or the other of a pair of relay magnets 272 and 275 (Fig. 1a).

These magnets are labeled "Tape-tape," meaning tape-to-tape verification, and "Card-tape," meaning card-to-tape verification respectively. The "Tape-tape" magnet is adapted upon energization thereof to open a pair of relay contacts 273 to maintain the stop line 259 disconnected from the negative side of the power line, regardless of the subsequent closure of a pair of timer contacts 7. The "Card-tape" magnet is adapted upon energization thereof to close a pair of relay contacts 276 and connect the stop line 259 to the negative side of the power line upon the subsequent closure of the contacts 7, thus automatically stopping the machine, as previously described. The purpose of the verifier, therefore, is to maintain the "Tape-tape" magnet 272 deenergized whenever tape-to-tape verification does not take place and to energize the "Card-tape" magnet when tape-to-tape verification does take place and, in addition, card-to-tape verification takes place.

The verifier includes an electromagnetically controlled relay for each index point position of the account number on each tape and on the card. Whenever the sensing devices sense a perforation in a tape or a card, a corresponding electromagnetic relay will become energized. For convenience, the relays of the verifier 265 have been labeled in groups of four and each group of relays is controlled by the index point positions in a tape or card representing a single digit of the account number. For purposes of illustration, the sensing pin groups, each of which is adapted to sense one complete character or digit, have been broken up and illustrated in Fig. 6 adjacent the respective groups of relays which they control. The groups of relays which accommodate the sensing of a card have been labeled "Card," the groups of relays which accommodate this month's tape 151 have been labeled "T. M. tape," and the groups of relays which accommodate last month's tape 150 have been labeled "L. M. tape."

All of the metallic sensing bars 169, which are employed for sensing last month's account numbers, are electrically connected together and all of the bars 169', which are employed for sensing the account numbers of this month's tape, are similarly connected together. Likewise, all of the bars 169a of the sensing device 145a are electrically connected together and corresponding bars of each sensing unit are also electrically connected. The common lead from the sensing devices 145, 145' and 145a has a pair of timer-controlled contacts 6 (see Figs. 1a and 6) disposed therein and upon closing of the contacts the verifier is adapted to become energized. Thus, all of the hundreds digits, all of the tens digits, and all of the units digits of the three account numbers appearing on the tapes 150, 151 and a card 154 or 177, as the case may be, are verified with one another. More specifically, each perforation of a character of an account number is verified with a corresponding perforation in the three record media 150, 151 and 152. In reality, the verifier shown in Fig. 6 is a three-way verifier in that it checks the account numbers on the two primary tapes 150 and 151 against each other and also checks them against the account number of any card which may be manually injected into the machine. For the present only, the dual tape circuits relating to the "T. M. tape" relay groups and the "L. M. tape" relay groups will be discussed.

The verifier of Fig. 6 includes a pair of output circuit lines 267, 268, by means of which the "Tape-tape" magnet 272 (see Figs. 1a and 6) may be energized, providing a pair of timer-controlled contacts 5 are closed. These output lines are associated with the "T. M. tape" and "L. M. tape" magnet groups through various magnet-controlled pairs of contacts which are arranged in series. The verifier also includes another pair of output lines 269, 270, by means of which the "Card-tape" magnet 275 may be energized subject to closing of the contacts 5. These latter output lines are associated with the three magnet groups, "Card," "T. M. tape" and "L. M. tape."

When all of the magnets in the verifier are in their normal deenergized position and the timer-controlled contacts 5 are closed, a circuit leading from the line 267 to the line 268 is complete so that insofar as the "Tape-tape" magnet 272 is concerned, this magnet is energized. The circuit existing from the line 267 to the line 268 may be traced as follows: line 267, contacts $a, b, c, d, e, f, g, h, i, j, k, l, m, n, o, p, q, r, s, t, u, v, w, x$, and line 268, all of which contacts just referred to are normally closed contacts. The contacts 273 are opened and the stop line 259 is disconnected from the negative side of the power line and the machine will continue to function. Under the same conditions when all of the magnets of the verifier are in their normally deenergized condition, a circuit leading from the line 269 to the line 270 through the various magnet-controlled series contacts is incomplete, and, therefore, the pair of contacts 276 remain open so that the stop line 259 is disconnected from the negative side of the power line, regardless of the subsequent closure of the contacts 7. Under these conditions also, the machine will continue to function. It will be understood that the above outlined conditions are obtained when tape-to-tape verification takes place in the sensing units 145 and 145' but does not take place among the three sensing units 145, 145' and 145a.

Where only tape-to-tape verification is concerned and no card is present in the machine, should any two corresponding pairs of relay magnets in the "T. M. tape" and "L. M. tape" groups become energized, by virtue of verification of a character in the two sensing devices 145, 145', the energized magnets will divert or reroute the circuit leading from the line 267 to the line 268 without breaking it, while the remaining corresponding unenergized pairs of magnets will not change over. For example, should the two units magnets labeled 1 in the "T. M. tape" group and "L. M. tape" group respectively both be energized, the rerouted or diverted circuit leading from the line 267 to the line 268 would be traced as follows: line 267, contacts a', b', c, d, e, f, g, h, i, j, k, l, m, n, o, p, q, r, s, t, u, v, w, x and line 268. Thus, where the account numbers of the two primary tapes 150 and 151 are alike, only matched pairs of magnets in the verifier groups will become energized and the circuit leading through the "Tape-tape" magnet 272 will remain complete and this latter magnet will remain energized, regardless of the subsequent energization of the contacts 5, so that the pair of contacts 273 will remain open and the machine will continue to function. When the account numbers on the two tapes differ, the various magnets in the two magnet groups are not energized in matched pairs and the unmatched pairs of magnets will not reroute the circuit through the various magnet-controlled series contacts but will open this circuit and not allow energization of the "Tape-tape" magnet upon closure of the contacts 5, thus allowing the pair of contacts 273 to remain closed and causing the stop line 259 to be connected to the negative side of the power line, subject to the closing of the pair of contacts 7 which close briefly while contacts 5 and 6 are closed, thus stopping the machine.

All of the above described verifying operations may take place only when the pair of timer-controlled contacts 6 disposed in the common line leading from the sensing mechanism 145, 145', 145a are closed near the beginning of a machine cycle, for otherwise the sensing apparatus would fail to transmit any signals for verification to the verifier.

The manner in which the account number appearing on a special account card inserted into the sensing device 145a is checked against the account numbers of the two primary tapes is similar in many respects to tape-to-tape verification of account numbers. When the account number on the card and on the two primary tapes are identical, corresponding relay magnets in the three relay groups, namely, "Card," "T. M. tape" and "L. M. tape" will become energized in unison. Under such conditions, the circuit leading from the line 269 to the line 270 will find a path through the various pairs of series contacts and the "Card-tape" magnet 275 will become energized upon subsequent closure of the contacts 5 so that the pair of contacts 276 will become closed and the stop line will be connected to the negative side of the power line whenever the timer contacts 7 are closed. Thus the machine will cease to function. Should the account number on the card be the same as the account number on the two tapes, corresponding relay magnets in the three groups will close, thus completing the circuit from the line 269 to the line 270, the "Card-tape" magnet 275 will become energized, thus closing the pair of contacts 276 and connecting the stop line to the negative side of the power line to terminate operation of the machine. The circuit, by means of which the line 269 is connected to the line 270, may be traced as follows: line 269, contacts a'', b'', c', d', e', f', g', h', i', j', k', l', m', n', o', p', q', r', s', t', u', v', w', y', z', a''', b''', c'', d'', e'', f'', g'', h'', i'', j'', k'' and line 270.

From the above description, to summarize, it will be seen that the function of the verifier 265 is either potentially to connect the stop line 259 to the negative power line or not to potentially connect the stop line to the negative power line. When the stop line is connected to the negative power line the machine will stop. The stop line 259 will only be connected to the negative power line when the account numbers on the two primary tapes fail to verify with each other or when the account numbers on the two primary tapes verify and also verify with the account number appearing on a card injected into the sensing device 145.

After the verification process has been completed, it is necessary that the account numbers appearing on the two primary tapes be perforated on the billing data tape 152. An extra pair of contacts, several of which have been given the common designation x', on each of the "L. M. tape" relays in the verifier is employed for transferring the verified account number to the billing data tape. These pairs of contacts are connected into four common wires, one for each index position point, included in a cable 277 shown in Fig. 6. The other twelve lines, four for each index position point of the three identifying numbers, are routed through a common cable 278 by means of contacts on the "T. M. tape" relays, several of which have been given the common designation x''.

Referring again to Fig. 1a wherein the continuation of circuits leading from the verifier 265 is shown, each of the twelve wires comprising the cable 278 is connected through respective pairs of timer-controlled contacts 9 to 20 inclusive to the line P++. The four common wires comprising the cable 277 are connected to the input of the decoding apparatus 180 in such a manner that code positions are maintained. The connecting wires for accomplishing this purpose pass through a cable 187 shown in both Figs. 1a and 7. Thus, when the timer-controlled pairs of contacts 5, 6 and 7 are closed and the verifier 265 is operative, the decoding apparatus 180 will be set into operation according to the particular account numbers which are verified, such operation occuring as the various pairs of contacts 9 to 20 inclusive are closed in three groups of four pairs of contacts each, i. e., 9, 10, 11 and 12; 13, 14, 15 and 16; and 17, 18, 19, 20. As previously explained, the four wires comprising the cable 277, which are connected to the four wires comprising the cable 187, are also connected to the sensing devices 145 and 145'.

While the various decoding instrumentalities are set into operation in the ordinary manner of decoding, as previously described, since a pair of timer-controlled contacts 39 in the output thereof remain open at this time (Figs. 1a and 26a), these instrumentalities are not energized and thus the information is not actually electrically decoded. The decoder input relay magnets 181, labeled 1a, 2a, 3a and 4a in Fig. 7, operate in the manner of ordinary circuit relays and the wires in the cable 187 are connected to corresponding wires in the cable 191 leading from the decoder output to the input of the perforator. In this manner, the coding account numerals are transferred directly from the two tapes 150 and 151 to the tape 152, and during the transfer operation not only are the proper perforating magnets 1c, 2c, 3c and 4c (Fig. 9) energized, but also the magnets DH and D for applying drive hole perforations to the tape and for advancing the same are energized.

The computing (subtracting) mechanism

In order to energize the perforating mechanism 220 and perforate the consumption of gas and/or electricity on the billing data tape 152, it is necessary that last month's meter reading be subtracted from this month's meter reading, or, in other words, that the data appearing on the primary tape 150 be subtracted from the data appearing on the primary tape 151.

A conventional computing machine is designated generally at 157, and modified to suit the exigencies of the present invention is adapted for complete automatic operation. This computing machine is illustrated in Figs. 12, 14 and 15 and is of the type shown and described in the patent to Marquess, No. 2,308,292, dated January 12, 1943, and entitled "Computing machine." This machine is adapted to be operated by an electric motor and the internal mechanism of the machine is such that when the total key is depressed the motor bar will automatically become depressed and set the machine into operation. One feature of operation in connection with computing machines of this type has been taken advantage of in the present instance to attain certain functions in connection with the operation of the present accounting machine. This feature resides in the fact that the print bars associated with the computing machine are adapted to remain elevated in their exact printing positions during a goodly portion of a complete machine cycle. Such elevation of the print bar is made possible by virtue of the shape of certain cam members which operate to elevate the print bars. Thus it is possible to open the motor circuit somewhere in the machine cycle immediately prior to or simultaneously with the elevation of the print bars and allow the motor to come to a stop with a definite assurance that the positioning of the print bars will not be disturbed. With the print bars thus elevated and the motor stopped, sufficient time is made available to perform other machine functions, after which the motor circuit may be closed and the computing machine will resume its operation and complete the cycle to lower the print bars to their original or non-operative positions. According to the present invention, as will become clear presently, the usual type bars associated with the print bars have been removed from the latter and also the hammer or striking mechanism, which operates upon these type bars, has been dispensed with. In their stead, the print bars have been provided with certain electrical take-off contact mechanism for closing circuits leading to other electrical machine instrumentalities. It is necessary that a certain time interval be allowed to permit this electrical take-off operation to become effective and while, under certain circumstances, the print bars will ordinarily remain elevated during normal machine operations, a sufficient length of time to allow for this take-off, it has been deemed advisable to prolong the length of time during which the print bars remain elevated so that there will be no possibility of the print bars being disturbed while the take-off operation is in effect. It has been found that by the simple expedient of opening the motor circuit the normal printing cycle will be prolonged, due to slowing down of the motor a sufficient length of time to permit the desired electrical take-off to become effective. In certain instances, such opening of the motor circuit will allow the motor to come to a complete stop while the print bars remain elevated. However, in order to make doubly certain that a sufficient length of time is allowed to take care of this electrical take-off operation, the present invention contemplates the provision of an automatic brake which is associated with the motor shaft and the operation of which is so timed that simultaneously with or immediately after, the motor circuit has been opened, the brake will take effect to stop the motor well within that portion of the cycle wherein the print bars will remain elevated. After the electrical take-off has been effected, the motor circuit is again closed, while simultaneously the braking effect is rendered inoperative so that normal machine functions may continue and the print bars may be lowered to await the next actuation thereof.

The computing machine, as shown in Figs. 12, 14 and 15, includes the usual tabulating keys 281, together with a series of solenoids 280, by means of which the keys are depressed. The remainder, representing the present month's bill, instead of being printed in the usual manner on a roll of paper, is, as stated above, electrically removed from the machine and applied to the perforator for operative energization of the latter. The computing machine 157 is provided with the usual series of vertical print bars 290 which, in the ordinary course of operation of the machine, are adapted to selectively become elevated to an extent commensurate with the manipulation of the tabulating keys 281. However, in the present instance, these print bars do not carry the usual movable type members or otherwise serve their usual printing function, but instead they are modified for the purpose of permitting them to selectively close predetermined circuits.

The remainder may be taken from the subtracter electrically by means of a pair of contact groups 284 and 285, (Figs. 12 and 14) together with their cooperating brushes 287 and 286, respectively. These latter brushes are mounted on the conventional "print bar" 290 of the computing device. Depending upon the particular figures to be set up in the machine and read out electrically, the print bars will be elevated to their respective commensurate levels for proper selective engagement of the brushes 287 and 286 with the contact groups 284 and 285 respectively.

As shown in Fig. 14, the print bars 290 have been labelled T$h$, H, T and U and each represents one digital order of the four-digit remainder representing the difference between this month's consumption figure and last month's consumption figure, expressed in cubic feet in the case of gas and in kw.-hr. in the case of electricity.

The upper group of contacts 285 and their associated brushes 286 constitute read-out elements by means of which the consumption figure is relayed to the coder 200 (Fig. 1b upper) through a cable 288 for subsequent decoding and ultimate punching by the perforator 22 on the billing data tape 152. The lower group of contacts 284 and their associated brushes 287 constitute read-outs elements by means of which the consumption figure is relayed to the data storing device 158 for selection of dollar and cents values representing gas tax, gas charge, gas total charge, electric tax, fuel adjustment, electric charge and electric total charge, all of which data is ultimately printed on the billing data tape 152.

In Fig. 14 the various wires leading from the four print bars 290 are shown as leading into four separate cables 291. However, these wires are ultimately connected as shown in Fig. 25b to the data storing device in a manner that will become clear presently.

The keyboard of the computing machine or subtracter 157, in the present instance, is comprised of ten number keys, together with three function keys and their solenoids, labeled A, B and C in Fig. 15. The function keys A, B and C, in the present instance, correspond to the function keys shown in the Marquess patent above mentioned and are, respectively, the motor bar, the subtract key and the total key.

This type of subtracting mechanism operates upon the well known Sundstrand principle wherein successive depression of keys in the keyboard, followed by depression of the motor bar, serves to set separate figures into the machine in their proper digital order. Furthermore, during the totaling cycle of machine operations, carry-over operations are automatically taken care of. Thus, in the present instance, the figures are electrically set into the subtracter successively one at a time from the decimal output circuits of the decoder 180. The solenoids 280 are wired together in common by a single wire leading to a pair of contacts 35 and each individual solenoid is provided with a lead wire, which wires are grouped together in the cable 185 leading to the decoder.

In order to set a multi-digit number, representing this month's consumption of electricity, into the subtracter 157, the pair of contacts 35 are adapted to become closed simultaneously with the energization of one of the decoder output coils 182. Such simultaneously closing of the contacts 35 and energization of the coil represents application of a numeral representing a single digital order to the subtracter. Each successive energization of a decoder output coil, accompanied by closing of the contacts 35, represents application of another numeral representing a different digital order. Thus, if a number having units, tens and hundreds digits therein is to be set into the machine, the contacts 35 will have to become closed three times in succession, each closing thereof being accompanied by energization of a decoder output coil.

For illustrative purposes, if it is desired to set the number 8956 (see the coded electric reading of Fig. 4), representing this month's billing data in kw.-hr., into the machine and thereafter subtract the number 8869 (Fig. 3), representing last month's billing data, therefrom to obtain the difference 0087 (Fig. 5) representing kw.-hr. of current consumed during the last month, the following operations will take place:

Depending upon prior operations that take place at the sensing mechanism 150, 151, the coding device 200, the verifier 265 and other operative instrumentalities ahead of the decoding device 180, the output coil 182 (Fig. 7) labelled 8 will become energized while the pair of contacts 5 are closed, thus causing the solenoid 280 associated with the key 281 labelled 8 to become energized and cause depression of the key. Shortly thereafter, by a similar set of circumstances, the key labelled 9 will become depressed followed by depression of the keys labelled 5 and 6 in the order named. In order to effectively set this number 8956 into the totalizer mechanism of the subtracter, it is necessary to depress the motor bar A and this is effectively done by momentary closing of the pair of contacts 42.

It is then necessary to set the second set of figures, namely 8869, into the machine and this may be done by successive depression of the proper keys followed by depression of the subtract key under the control of the contact 43. Toward these ends, the decoder 180, operating under the influence of the sensing mechanism and by means of its output coils 182, causes depression of the key labeled 8 two times and depression of the keys labeled 6 and 9 once, such depression taking place in rapid succession, followed by closing of the contacts 43 to operate the subtract key B. An idling cycle is then resorted to and this is caused by a second momentary closing of the pair of contacts 42 to actuate the motor bar A.

Because of the fact that machines of the type shown in the Marquess patent operate upon the principle that depression of the total key automatically causes depression of the motor bar, the subtracting operation takes place immediately upon depression of the total key. Upon depression of the total key C by closing of the contacts 44, the print bars 290 will become elevated to an extent commensurate with the remainder (0087) which represents the difference between this month's figure and last month's figure.

A feature which is peculiar to accounting machines of the type illustrated herein, and also shown and described in the above mentioned patent to Marquess, is that only a minor portion of the machine cycle is devoted to actual elevation or movement of the print bars. These print bars go up to their final position rapidly and once they have been elevated they will remain elevated for a comparatively large portion of the machine cycle. This phenomenon exists by virtue of the fact that, in machines of this type, time must be allowed for the striking hammer associated with the type bars to strike the type bars and cause the latter to be forced against the ribbon and the ribbon to be forced against the record paper. In the present instance, the type bars, striking hammer, etc., have been removed, but the internal mechanism of the accounting machine remains the same and, as a consequence, for purposes that will be made clear presently, it is possible to open the motor circuit immediately after the print bars have been elevated and apply a brake to the motor shaft to stop the motor with the assurance that the type bars will not deviate from their final position until such time as the machine has come to rest and the motor has again been energized to resume the machine cycle. Under certain circumstances, it is unnecessary to employ a brake on the motor shaft since the motor will always come to rest prior to lowering of the print bars. Under other circumstances, however, as for example, where the nature of the mechanism employed is such that the load on the motor is extremely light, the braking mechanism may be necessary.

The remainder, i. e. the difference between the consumption figure representing this month's bill and the consumption figure representing last month's bill, must be available in the apparatus for a relatively long period of time to allow certain electrical functions to take place. To make this remainder thus available, a motor 289 (Fig. 15), which controls the operation of the subtracter 157, is deenergized in the middle of the cycling operation. This deenergization is controlled by means of a pair of timer-controlled contacts 45 which are in series with the current supply line. The pair of timer-controlled contacts 45 are opened so that the print bars will remain in their indicating position, as above described. Upon reestablishment of the power circuit by closing the pair of contacts 45, the apparatus will finish the interrupted cycle and be ready for another subtracting operation. The motor 289 is provided with a motor shaft 350 which carries a drum 352 designed for cooperation with a braking yoke 354 mounted on a pivoted arm 356. The arm 356 carries an armature 358 associated with an electromagnet 360, the windings of which are directly connected to the power line and have interposed therein a pair of timer-controlled contacts 36. The timing of the operation of the pairs of timer-controlled contacts 36 and 45 is such that upon opening of the pair of contacts 45 to disconnect the motor 289 from the source, the pair of contacts 36 become closed to apply the brake to the motor shaft 350. Likewise, when the pair of contacts 45 become closed to again set the motor into operation, the pair of contacts 36 become opened to relieve the braking action on the shaft 350.

The operations that take place in connection with gas accounting wherein numbers representing gas consumption in cubic feet are entered into the subtracter are similar to those described above.

The data storing device

After the computing mechanism 157 of Fig. 15 has computed the actual consumption in the proper billing units, i. e. kilowatt-hours, hundreds of cubic feet, etc., by performing the subtracting operations outlined above, the charge to be made for this consumption must be found and perforated on the billing data tape 152 of Fig. 5. The majority of public utility companies compute the charges for different consumption by means of complex sliding scale rates wherein numerous charges, such as fuel adjustment and tax charges, are involved in the transactions. Conventional computing machines are incapable of computing these complex rates efficiently and, therefore, the usual practice by public utility companies is to prepare visual charts containing every consumption figure likely to be encountered, together with the money charge data adjacent it. This latter money data is usually precomputed by comptometrists and each time a bill is prepared the amount to be charged is visually obtained from the chart by the person preparing the bill. Another method commonly employed by the public utility companies involves the use of perforated cards and sorting machines for entering predetermined data relating to each consumption figure on the cards. After this month's meter reading has been subtracted from last month's meter reading and the consumption figure obtained, this data is perforated on the various cards and the cards are then placed in a sorting machine and sorted according to the various consumption figures. Thus, cards having like consumption figures are grouped together in a stack and the fixed charge data in dollars and cents is determined from the usual public utility chart and set up in a perforating machine. The cards of the related groups are then sent through the perforating machine and the precomputed data is applied thereto. After this procedure has been followed for each and every consumption figure, the cards are again reclassified according to their original order and the entire batch of cards is then sent to the billing machine where the ultimate bill for the various consumers is prepared. The electric data storing device is an integral part of the present accounting machine and automatically performs the operations required of an operator utilizing the visual rate chart or of an operator employing the sorting procedure above referred to.

The data storing device 158 is comprised of cooperating units including a cross bar selector 310 (Figs. 23 and 24), a rate selector 312 (Fig. 25a) and a plug board 316 (Figs. 16, 17 and 18), by means of which the precomputed data is manually set up in the machine and retained therein for subsequent automatic selection.

Reference may be had to Patent No. 2,386,482, dated October 9, 1945, for Data storing device and selecting means therefor, for illustration of a similar apparatus. In the data storing device illustrated in this co-pending application, a sensing device is employed for sensing consumption figures appearing in the perforated tape and by means of the sensing device electrical circuits leading directly to the selecting mechanism of the data storing device are closed. After selection is made, the result is directly perforated on a second tape. The present data storing device differs from that shown in our co-pending application in that selection, instead of being a function of a sensing operation, is a function of the subtracting operation above referred to and the subtracting device 157 is utilized to close the selecting circuits leading to the data storing device. The output circuits of the data storing device are connected to a coding device 200 (Figs. 1b and 18), by means of which the decimal data selected is converted into code and sent to the perforator 220.

The plug board

The plug board 316 is comprised of a plurality of units, one for each precomputed value corresponding to a consumption figure, as shown in Fig. 18. The precalculated money data for the initial charge, the tax charge, the fuel adjustment charge and the total charge, which latter charge is based upon the previously mentioned charges, are manually set into the unit by means of small metallic clips 317, one of which is shown in perspective in Fig. 17. The various units of the plug board are selected by means of the cross-bar mechanism 310, shown in Fig. 23. The plug board 316 involves in its general organization a grid or board 410 in the form of a framework through which there projects a series of contact pins 321 arranged in vertical and horizontal rows. Suitably supported at the rear of the board 410 and anchored in a series of vertical supports 412 are a plurality of conductive contact bars 319 which are adapted to cooperate with the contact pins 321 for circuit closing purposes when these pins are selectively connected to their respective bars by means of the clips 317. The conductive bars 319 are each supported upon and held in position by means of insulating strips or bars 320. The contact bars 319 are electrically connected to the input of the coder 200, as shown in Figs. 8 and 18, through the cable 201.

The board 410 is divided into two sections, as shown in Fig. 18, one section representing gas consumption and labeled accordingly in Fig. 18, and the other section representing electric consumption and likewise labeled.

The pins 321 are wired together and commoned in vertical rows, each common row thereof being electrically connected to one of a pair of contacts, these contacts being included in two contact groups 318 and 318a. The other contact of each pair of contacts in the groups 318 and 318a is connected to one of a pair of timer-controlled contacts, which contacts, for convenience, are shown grouped together in Fig. 18 and are designated by numerals ranging from 61 to 74 inclusive. The contacts 61 to 64 inclusive represent the digits of the charge value. Contacts 65, 66 and 67 represent a fuel adjustment charge. Contacts 68, 69 and 70 represent a tax charge, while contacts 71 to 74 inclusive represent the total charge. One contact of each pair of contacts in the group 61 to 74 inclusive is connected to the negative power line. It will be seen that when the cross bar mechanism 310 serves to select a particular unit in the data storing device and when all of the contacts of the corresponding bank of groups of contacts 318 or 318a, as the case may be, are closed and thereafter the various timer-controlled contacts 61 to 74 are successively closed, the figure set into the data storing device, as controlled by the positioning of the clips 317 will be signaled to the coding device 200 and these figures will become perforated on the billing data tape 152 by the perforating mechanism 220.

The cross bar selecting mechanism

Referring now to Figs. 23 and 24, wherein the cross bar selecting mechanism 310 is shown, the various bank or groups of contacts 318 and 318a are carried in the framework 420 and are adapted to be selectively actuated by cross selection between a horizontal bank of magnets 306 and a vertical bank of magnets 305. A plurality of shiftable, horizontally disposed bars 422 extend beneath each horizontal row of contact groups 318 and 318a, and a plurality of spring actuating members 424 are secured to the various bars 422 and normally occupy positions out of alignment with and slightly to one side of the contact groups 318 and 318a which they control. The various pairs of contacts of each bank or group 318 and 318a, while shown in alignment in Fig. 18, are actually arranged in adjacent groups as shown in Fig. 23, but the two groups thereof are designed for simultaneous actuation thereof. Accordingly, a pair of actuating fingers 426 (see Fig. 24) are secured to each of the spring actuating members 424 in spaced relationship and these latter fingers are adapted when the members 424 are elevated, to engage the two contact groups of each bank of contacts and close all of the contacts thereof simultaneously. Accordingly, the outer free end of each member 424 is bifurcated as at 428 and the bifurcations thereof are adapted to straddle a respective vertically extending shiftable rod 430, having collars 432 thereon. The bars 422 are each connected to an armature 434 of one of the magnets 305, while the rods 430 are each connected to an armature 436 of one of the magnets 306. It will be seen, therefore, that upon energization of any one of the magnets 305, its corresponding shiftable bar 422 will be moved to the left, as shown in Figs. 23 and 24, so that the bifurcations of the various members 424 straddle their respective rods 430. Upon subsequent energization of a selected magnet 306, its respective rod 430 will be moved vertically and the collar 432 thereon, which is positioned directly beneath its cooperating bifurcation, will cause one of the members 424, and only one, to be elevated by bending the member upwardly. In this manner, the fingers 426 carried thereby will engage and actuate one of the contact groups 318 or 318a, as the case may be. It will be seen that it is essential for proper operation and selection of a particular contact groups 318 that the selected magnet 305 must be energized prior to energization of the selected magnet 306. Toward this end, each armature 434 has associated therewith a pair of normally open contacts 450, which contacts serve to open or close a common circuit for all of the magnets 306. Thus, the circuits of the magnets 306 are normally maintained open and energization of these latter magnets cannot take place until such time as one or another of the pairs of contacts 450 have become closed.

It will be seen that upon selection and energization of any one magnet within the horizontal bank 306 thereof, and upon selection and energization of any one of the magnets 305 in the vertical bank thereof, a single contact group 318 or 318a will be selected and the contacts thereof simultaneously closed for printing of the proper charges on the billing data tape. The magnets 306 are selected solely according to the tens and units values of the consumption figure as determined by the output mechanism 300 of the subtracting machine 157. Inasmuch as charges are billed in even figures only, the present apparatus requires the use of only fifty of the magnets 306 in the main horizontal bank thereof and these fifty magnets will accommodate one-hundred consumption figures, i. e., from 0 to 98 inclusive, as far as the units and tens digits of the consumption figure is concerned.

The magnets 305 are selected partly according to the particular rate character in effect and undergoing decoding in the decoding device 180 as controlled by four lines leading from the contacts which are controlled by the decoder output magnets 182, labeled 1b, 2b, 3b and 4b in Fig. 7 (also labeled "rate control magnets"), and partly according to the hundreds digit of the consumption figure, as will appear presently. These latter four lines are shown as passing through a cable 279 in Figs. 1b and 25a.

The horizontal bank of magnets 306 of Fig. 23 are shown as being in physical alignment along the upper edge of the cross bar selector mechanism. Electrically, however, the magnets 306 are arranged for cross selection within the main horizontal bank of Fig. 23 in five horizontal banks 306' and ten vertical banks 306'' as shown in Fig. 25b. Selection of the horizontal banks of magnets 306', shown in Fig. 25b, within the main horizontal bank 306 thereof, shown in Fig. 23, is accomplished by the tens contact group of the subtracting mechanism 300. Accordingly, the various contacts of the tens group thereof are connected through a cable 299 to all of the magnets in the vertical banks 306'' thereof. Selection of the horizontal banks of magnets 306' is controlled by means of a vertical group of circuit-separating magnets 307', labeled 0, 2, 4, 6 and 8, whose energization is controlled from the units group of contacts in the output mechanism 300. Accordingly, the even contacts in the units group thereof, i. e., the contacts labeled 0, 2, 4, 6 and 8 in Fig. 25b, are connected through a cable 298 to their respective magnets 307'. It will be seen that upon energization of one of the five lines passing through the cable 298 and of one of the ten lines passing through the cable 299, one magnet in the horizontal main bank of magnets 306 of Fig. 23, and only one, will be selected for energization. The circuit-separating magnets 307' are employed for the purpose of preventing undesirable feedback phenomena which would otherwise occur if direct cross selection utilizing the units and tens contact groups of the subtracting mechanism were resorted to.

The odd contacts in the units group thereof, i. e., those contacts which are labeled 1, 3, 5, 7 and 9, are electrically connected together and to the stop line 259 through a pair of timer-controlled contacts 56. Thus it will be seen that should an odd-numbered consumption figure be encountered, the machine will stop automatically upon subsequent closure of the contacts 56.

The rate selector

As previously stated, selection of a magnet 305 in the vertical group thereof (Fig. 23) is controlled partly according to the particular rate character in effect and partly according to the hundreds contact group of the subtracting output mechanism 300 (Fig. 25b). Accordingly, although the magnets 305 are shown in Fig. 23 as being physically arranged in alignment along one vertical edge of the cross bar mechanism 310, electrically they are arranged in four groups of four magnets each, as shown in Fig. 25a. Each group thereof corresponds to one of four rates as evidenced by the presence of a rate character on the two primary tapes 150 and 151. These groups have been labeled accordingly. The magnets of each group of magnets correspond to the four lowest digits, i. e., the digits 0, 1, 2 and 3 in the hundreds decimal position of the consumption figure. Utilizing only these four lowest digits, no consumption figure larger than "398" will commonly be encountered. Selection of the various groups of magnets 305 is attained by means of four rate selecting magnets, designated in Fig. 25a as 1e, 2e, 3e and 4e. These latter magnets operate to make proper selection of any two of the four groups of magnets 305 in the vertical bank of magnets shown in Fig. 23. This selection of groups, representing the various rates encountered, is made from the decoding apparatus 180, shown in Fig. 7, in a manner that will be now more fully set forth.

As previously stated in the general description of the invention, four rates are employed herein for illustrative purposes in preparing the bills. These rates are residential gas, residential electric, commercial gas and commercial electric. The rate character which is applied to the two primary data tapes 150 and 151 indicates the combination of rates under which that account is to be billed. This rate character is decoded in the usual manner by the decoding mechanism 180 of Fig. 7. Since the rate characters employed are arbitrarily either the figures 1, 2, 3 or 4, as expressed in the decimal system, the decoding thereof will cause energization of any one, and only one, of the corresponding decoding output magnets 182, labeled 1b, 2b, 3b and 4b. The output circuits of these four magnets are connected through the cable 279 (see Figs. 1b and 25a) to the four rate selecting magnets 1e, 2e, 3e and 4e. It will be seen, therefore, that upon energization of any one of the four magnets labeled 1b, 2b, 3b and 4b, in the decoding mechanism 180, and the closure of a pair of timer-controlled contacts 29, energization of a corresponding rate selecting magnet 1e, 2e, 3e or 4e will take place.

After selection of the two groups of magnets 305 representing the prevailing rates has been made, it is necessary to make selection of one individual magnet within each group at successive times during the operation of the machine, once for the perforating of the proper gas billing data and once for the perforation of the proper electric billing data. Such local selection of magnets within a previously selected group is, as previously stated, a function of the four lowest digits in the hundreds decimal position of the consumption figure in each case (gas or electric). To make such selection, the four contacts in the hundreds group of contacts of the subtracting output mechanism 300 (see Fig. 25b) are conducted through a cable 297 and through two groups of timer-controlled contacts labeled 57, 58, 59, 60 and 83, 84, 85 and 86 in parallel, and also through additional groups of contacts 57', 58', 59', 60' and 83', 84', 85' and 86' in parallel, associated with the magnets 1e, 2e, 3e and 4e to the individual magnets 305 in the selected groups thereof.

It will be seen that after selection of any two of the groups of four magnets 305 has been made and the magnets 1e, 2e, 3e or 4e, by means of which the selection was made, have become locked in an energized condition, as will presently be set forth, selection of the individual magnets in each selected group will be made from the subtracting output mechanism 300 successively, inasmuch as the timer-controlled contacts 57, 58, 59 and 60 become closed simultaneously (see Fig. 25a) prior to simultaneous closing of the contacts 83, 84, 85 and 86. This former group of contacts operates to control the selection of magnets for gas billing, while the latter group of contacts operates to control the selection of magnets for electric billing.

Referring now specifically to Fig. 25a, each of the magnets 1e, 2e, 3e and 4e serves to control a pair of locking contacts 303, by means of which that magnet will remain locked once it has been initially energized. A pair of normally closed contacts 307 are associated with each of the magnets 1e, 2e, 3e and 4e, and these latter contacts are arranged in series and serve, when all of them are closed, to connect the stop line 259 to the negative side of the power line through a pair of timer-controlled contacts 30. It will be seen that when all the rate selecting magnets remain unenergized and their respective contacts 307 are all closed, continuity from the stop line 259 to the negative side of the power line will exist through the contacts 30 and the machine will stop. However, when any one of the contacts 307 become open due to energization of their respective controlling magnets, the machine will continue to function.

The six higher consumption figure contacts in the hundreds group of contacts of the subtracting output mechanism 300 (Fig. 25b), i. e., those which are not connected through the cable 297 to the rate selecting magnets 1e, 2e, 3e and 4e, are wired together in common and to the stop line 259 through the previously mentioned pair of timer-controlled contacts 56, in order that when an account appears whose consumption figure is higher than that for which the apparatus is intended, the machine will automatically stop upon closure of the contacts 56 in order that the account may be taken care of by usual bookkeeping methods. It is obvious that if it is desired to accommodate a higher consumption figure than the arbitrarily selected top limit consumption figure above referred to, the apparatus may readily be rewired and the only alteration necessary is to connect additional contacts representing still higher digits in the hundreds group of contacts of the subtracting output mechanism 300 to the rate selecting magnets through the cable 297, while at the same time disconnecting these higher digital contacts from the stop line. Nine of the contacts, namely, those labeled 1 to 9 inclusive, of the thousands group of contacts are wired to the stop line 259.

Since the capacity of the machine as illustrated herein is limited to a high consumption figure of 398 kw.-hr., expressed in even numerals, the T$h$ bar of the subtracter will, during all normal operations, remain at the 0 position. Should this bar through improper operation advance to any of the contacts 1 to 9 inclusive, it is desired that the machine shall be brought to a stop. Accordingly, the 1 to 9 contacts inclusive of the T$h$ row, as shown in Fig. 25$b$, are wired to a magnet 331. The magnet 331 is adapted upon energization thereof to close a pair of contacts 332 to thus effectively energize the stop line. It will not suffice to connect the contacts 0 to 9 inclusive directly to the stop line inasmuch as it is necessary to connect the stop line to a negative source. The contacts 332 make such a provision. The contact labelled 0 is, of course, connected to each of the magnets 305 by means of a line 330 and thus if the contact on the T$h$ bar of the subtracter does not remain in engagement with the 0 contact the rate selector mechanism will not function.

It has previously been stated that should a rate character of a customer be changed during the middle of a billing period, so that it will appear differently on the two primary tapes, the machine will be caused to stop. This is due to the fact that the presence of different rate characters on the primary tapes will cause energization of a magnet other than one of the four magnets labeled 1, 2, 3 and 4 (Fig. 7), which are connected into the rate selecting device of Fig. 25$a$. In such an instance, none of the magnets 1$e$, 2$e$, 3$e$ and 4$e$ will become energized and all of the contacts 307 will remain closed, whereupon the stop line 259 will become connected to the negative side of the power line subsequent to the closure of the timer-controlled contacts 30 and the machine will cease its operation.

Where an erroneous rate character appears on either of the two primary tapes or upon both of them, a similar set of conditions will obtain. In such an instance, two figures will be applied to the input of the decoder and a magnet, other than one of the four magnets labeled 1$b$, 2$b$, 3$b$ and 4$b$, will become energized, thus failing to cause energization of one of the magnets 1$e$, 2$e$, 3$e$ and 4$e$. Obviously, under these conditions the machine will stop.

Where the rate for an account is changed in the middle of a billing period, a card, such as the card 156, is inserted in the sensing mechanism 145$a$. In such an instance, two of the rate characters which appear on the primary tape are read in parallel and are also read in parallel with a third rate character appearing on the card and differing from the readings of the other two rate characters. Thus, in the decoding apparatus, upon such triple verification, a character will appear which will not affect any of the magnets 1$e$, 2$e$, 3$e$ and 4$e$, and the machine will be caused to stop in the manner indicated previously.

*Timer-controlled operation*

Referring now to Figs. 1$a$ and 1$b$, the various operating instrumentalities, such as the sensing device, the subtracter, the decoder, the coder, the data storing device, the perforating device, etc., are diagrammatically shown electrically connected together in such a manner as to form a complete calculating and accounting machine utilizing telegraphic type tape for recording purposes and performing the results set forth earlier in the description of the invention.

The operation of each assembly or instrumentality is controlled by means of ninety-nine timer-controlled pairs of contacts, the operations of which are graphically illustrated in Figs. 26$a$ and 26$b$. In the graph shown in these two figures, provision has been made for a number of contacts in excess of one-hundred and it will be understood that certain of the spaces provided in this graph are unused, their existence being for the purpose of accommodating any additional contacts which it is desired to employ for performing special functions not disclosed in this specification.

In the following description, the various operations of each assembly or instrumentality will be set forth by reference to the graph, and to the various contacts whose opening and closing movements are portrayed therein. Reading horizontally along the graph, there are eighty-nine index points or positions of machine operation. For the present, it will be assumed that the account numbers appearing on the two primary tapes 150 and 151 verify with each other but that they do not verify with a new account card 154 inserted in the special sensing device 145$a$. It will also be assumed that the consumption figure for both instrumentalities, i. e., gas and electricity, is within the limit of the electric data storing device 158. Special contingencies, such as the opening of a new account, closing of an account, the failure of account numbers to verify, etc., will be treated hereinafter.

The start-stop operation of the apparatus has previously been set forth, but for the purpose of convenience and in order to maintain proper sequence of operation, this starting and stopping of the machine will be briefly restated.

When the apparatus is set up for operation, the two primary tapes 150 and 151, representing this month's account and last month's account, are disposed in their respective portions of the tape sensing device 145, while at the same time a new account card 154, of the type shown in Fig. 19, is in position in the sensing device 145$a$. The switch 245 (Fig. 1$b$) is first closed, thus making power available at P+ for additional circuit operations. Thereafter, the switch 249 is thrown on and the timer motor 242 is energized, thus rotating the drum 240. When the drum 240 has rotated until it assumes its first angular position increment, as shown in the graph of Fig. 25$a$, the timer-controlled contacts 1 close momentarily, thus energizing the start relay magnet 247, as previously explained, and thereby causing power to be applied to the line P++ due to the closure of the contacts 255. The timer-controlled contacts 5 and 6, upon closing, cause the verifier 265 and its associated relay magnets 275 and 272 to assume positions determined by the information appearing on the tapes 150 and 151 and on the card 154. Since it has been assumed that the primary tapes verify with each other, but not with the card 154, the magnet 272 will become energized, while at the same time the magnet 275 will remain unenergized. Therefore, upon subsequent closure of the timer-controlled contacts 7, the stop line 259 will not become connected to the negative side of the power line. If however, the card-tape magnet were to be energized due to a failure of the primary tapes to agree, the contacts 276 would become closed and, upon closure of the contacts 7, current from the negative side of the line would issue through contacts 7, normally closed contacts 274 of the average relay 354 (Fig. 1$b$) contacts 276 of the card-tape relay (Fig. 1a) to the stop line 259. The timer-controlled contacts 8 become open at this time and this operation would ordinarily interrupt the common line 190 from those contacts on the decoder magnets 181 which normally cause the energization and actuation of the perforating mechanism 220. The circuit by means of which such perforation would ordinarily take place exits from the P++ line (Fig. 1a) through the timer controlled contacts 21 (closed), timer controlled contacts 8, through the normally closed contact 274 of the Card-Tape magnet 275 common line 190 of the decoder, and from thence through the various closed contacts 189, 192, 193 etc., of the magnets 1a, 2a, 3a, 4a of the decoder 180 (Fig. 7) to the line 191 leading to the perforating mechanism 220 (Fig. 1b).

However, at the same time that the contacts 8 become open, a pair of contacts 400 become closed (Fig. 26a) by virtue of the energization of the magnet 272. This operation effectively shorts the contacts 8 and maintains the common line 190 through substantially the same circuit as that just traced to permit perforation of the account number on both primary tapes 150 and 151.

Opening of the contacts 8 prevents unauthorized perforation of the account number if the two primary tapes do not vertify. In such an event the magnet 272 does not become energized and, therefore, the contacts 400 do not become closed and the common line 190 is caused to remain open to prevent the perforation of the account number. The timer-controlled contacts 9, 10, 11 and 12 are simultaneously, momentarily closed, thus causing perforation of the first digit of the account number appearing on the billing data tape 152. Closure of the contacts 9, 10, 11 and 12 (Fig. 1a) serves to close various circuits leading from the P++ line of Fig. 1a through these contacts, lines 278 (Fig. 6), contacts of the T. M. tape magnet, lines 277 and 187 and through the magnets 1a, 2a, 3a, 4a of the decoder 180 (Figs. 1a and 7) to the common line 190, which is connected to the negative side of the line through contacts 8 or 400 as previously described. Thus, the contacts 9, 10, 11 and 12 make possible the selective energization of the decoder magnets 181 as controlled by the magnets in the verifier 265. Similarly, the timer-controlled contacts 13, 14, 15, 16 and 17, 18, 19 and 20 become momentarily closed in the respective order named, thus causing successive perforation of the second and third digits of the account number.

The timer-controlled contacts 8 again become closed and the contacts 5 and 6 opened. Opening of the contacts 6 discontinues current from the P+ line (Fig. 6) to the verifier while opening of the contacts 5 (Fig. 1a) discontinues current to the magnets 275 and 272 which are the output magnets of the verifier. Closure of the contacts 8 allows current to proceed from the + line (upper right corner of Fig. 1a) to the contacts 40 (now closed) and from thence through the contacts 8, the now closed contacts of the card-tape magnet to the common line 190. Thus the verifier 265 is deenergized and the common line 190 again completed. The timer-controlled contact groups 23 and 24 (Fig. 1a) become simultaneously, momentarily closed, along with the timer-controlled contacts 25, 26, 27, 28 and 29 (Figs. 1b and 25a). This causes the rate selector 312 to become preset in the manner previously described and also causes the perforation of the rate character by action of a circuit including the cable 191 leading from the decoder 180. The timer-controlled contacts 29 (Fig. 25a) remain closed during the remainder of the complete cycle, thus keeping the rate selector 312 in its preset condition by making current available to the magnets 1e, 2e, 3e and 4e. Immediately thereafter, the timer-controlled contacts 30 become momentarily closed thus making current available at the contacts 307 to connect the stop line 259 to the negative power line to stop the machine in case of a rate character discrepancy.

The timer-controlled contact groups 31, 32, 33, 34 and 75, 76, 77, 78 associated with the sensing mechanism 145' at the upper left hand corner of Fig. 1a are each adapted upon closing thereof to relay a particular digit in coded form to the decoder 180 for subsequent decoding and transmittal in decoded form to the subtracting mechanism. The contact group 31 represents the thousands digit of this month's gas reading expressed in cubic feet, the group 32 represents the hundreds digit of the reading and the groups 33 and 34 represent the tens and units digits of the reading. The reading selected for illustration in Figs. 4 and 5 on the primary tape 151 and billing data tape 152 is 5320.

It will be recalled that the nature of the subtracting mechanism is such that upon successive depression of the various number keys 281 to the extent of four depressions, the thousands digit is first entered into the machine in the units position. As soon as the second key is depressed the hundreds digit is entered into the machine in the units position and the digit already existing therein is shifted to the hundreds position. When the third key is depressed the tens digit is entered into the machine in the units position while the previously entered digits are stepped up one order. Finally, when the fourth key is depressed the units digit is entered in the units position while the three previously entered digits are advanced one order. The ultimate result of four successive depressions of the keys 281 will be the entering of the reading into the machine with the respective digits assuming their correct digital orders.

To enter this month's gas reading 5320 into the subtracter 157, the timer controlled contact group 31 momentarily closes at point 7 in the machine cycle while at the same time the contacts 35, 39, 40 and 41 also become closed. In addition the contacts 8 have been previously closed. Upon closure of the contacts 31, current flows from the P++ line (top of Fig. 1a), through the contacts 31, sensing brushes and perforations in the tape 151 at the index point position representing the thousands digit of this month's gas reading and from thence through the cable 187 to the decoder 180. Closure of the contacts 39 allows current to proceed from the negative side of the line (top of Fig. 1a) to energ'ze the output line 184 leading from the decoder output magnets 182. Closure of the contacts permits energization of the common line 190 of the decoder as previously explained. The circuit extending from the positive or P++ line of Fig. 1a downwardly through the contacts 40 and 8, normally closes contacts of the card-tape magnet 275 to the line 190. The decoder 180 is thus energized and actuated in the manner previously described and the thousands digit of the gas consumption figure, i. e. the digit 5, is entered into the subtracter and assumes temporarily a units order in the machine. When the contact group 32 becomes closed at point 8 in the cycle a similar set of conditions obtains and the hundreds digit, i. e. the digit 3, is entered into the subtracter and assumes the units order while the previously entered digit is advanced to the tens order. Likewise, when the contact group 33 becomes closed the digit 2 is entered. Finally, when the contact group 34 closes the digit 0 is entered and the various digits assume their respective digital orders to represent the consumption figure 5320.

It is to be noted that the contacts 40 are closed successively in the above operation for very brief periods of time. This "spot" closing of these contacts allows for any small discrepancy in the closing of the contacts 31, 32, 33 and 34 and thus prevents chattering of the decoding mechanism. Any such chattering of the decoding mechanism would obviously cause a sequence of errors to be passed on to the subtracter, as well as to the perforator instead of a single number representing the desired digit. The contacts 40 therefore close momentarily only when complete operation of the decoding mechanism to produce a single digit has been attained.

Simultaneously with the entering of this month's gas reading into the subtracting machine, provision is made for perforating the same on the billing data tape 152. Toward this end, upon closure of the contact group 31 representing the thousands digit of the reading, not only will the magnets 1a and 2a (which represent the coded digit 5) become energized through the cable 187, but the contacts 189 (Fig. 7) of these two magnets will become closed thus allowing current to flow from the energized line 190 through the cable 191 to operate the perforating mechanism 220 in the manner previously described and cause perforation of the digit 5 in code form on the billing data tape 152. Perforation of the hundreds, tens and units figure of the reading 5320 takes place in a similar manner upon closing of the contacts 32, 33 and 34 respectively.

The magnets 181 of the decoder 180 and their associated contacts 189 are employed as relay devices to actuate the perforator 220 to perforate the gas and electric readings on the billing data tape instead of operating the perforator directly from the sensing devices 150 and 151. This expedient is resorted to inasmuch as the perforator requires a relatively heavy current supply and the delicate sensing brushes of the mechanisms 150 and 151 are incapable of withstanding such heavy application of current.

The contacts 22 become open just prior to perforation of the thousands digit of the reading, thus breaking the common line to the perforator. A pair of spot closing contacts 41 operate upon the same principle as the contacts 40 in order that the perforator coils 1c, 2c, 3c, 4c, and DH may become deenergized and their corresponding punches given time to return to their normal positions before the coil D becomes deenergized, thus allowing the tape advancing mechanism to move the tape. The contacts 41 therefore provide a short energizing pulse for the various magnets with adequate time in-between impulses for restoration of the punches to their normal positions.

From the above description it will be seen that the various digits of this month's gas reading are sensed, decoded, set into the subtractor in their proper digital orders, and also relayed without decoding to the perforator and perforated on the billing data tape between points 7 and 11 of the machine cycle.

The timer-controlled contacts 42 now become closed at point 12 in the machine cycle thus closing a circuit from the negative side of the line (top of Fig. 1b) through these contacts to the electromagnet A280 which controls the function key A (Figs. 1b, 12, 14 and 15). The function key A corresponds to the motor bar key of the above cited Marquess patent and thus the subtracter is sent through its adding cycle and the consumption figure 5320 is entered into the totalizing instrumentalities. Adequate time is allowed for this adding cycle by proper placement of the cams or projections 241 on the timer drum 240.

The timer-controlled contacts 46, 27, 28 and 49 become closed successively beginning at point 15 in the machine cycle. The contacts 35, 39, 40 and 41 are operated in conjunction with the former contacts in a manner and for the same purpose as that previously described in connection with the closing of the contacts 31, 32, 33 and 34. In the same identical manner the four figures 5280 of last month's gas reading appearing on the tape 150 (Fig. 3) are relayed to the decoder and to the perforator for ultimate perforation on the billing data tape 142 (Fig. 5), and also for entry into the subtracter.

The timer-controlled contacts 43 then become closed at point 19 in the cycle thus causing depression of the function key B and, accordingly the subtracting machine is sent through its subtracting cycle wherein the number 5280 is subtracted from the number 5320, leaving a balance of 0040 in the totalizer mechanism. The timer control contacts 42 become momentarily closed at point 24 in the machine cycle, thus putting the subtracting machine through an idling cycle preparatory to the total taking operation.

The timer-controlled contacts 44 become closed at point 27 in the machine cycle thus energizing the electromagnet 280 which operates the total taking key C.

Upon depression of the total taking key C, the subtracting mechanism passes through its normal printing operation wherein the print bars 290 become elevated for engagement by the usual printing hammer. However, in the present instance, due to substitution in the machine of the various electrical contact elements 284, 285, 286, 287 a readout operation is effected in place of the normal printing function. Shortly after the closing of the contacts 44 at point 27 in the machine cycle, the contacts 45 in the circuit of the motor M become open thus allowing the machine to stall. The contacts 45 are allowed to remain open for a relatively long period of time, i. e. until point 45 in the machine cycle. During the intervening time provision is made for performing all the necessary readout operations and other machine functions in order that the gas consumption figure may be perforated on the billing data tape, and in order that the data storing device may yield the selected information including the gas charge, gas tax and gas total and also in order that this latter information may be perforated on the billing data tape.

Immediately after opening of the contacts 45 and deenergization of the motor M, a pair of contacts 36 become closed thus causing current to flow from the P++ line, through the contacts 36, braking magnet 36 to the negative side of the line. The braking mechanism 352, 354, 356 etc., is set into operation upon energization of the magnet 360 and the motor M is thus brought to a standstill at about point 28 in the machine cycle.

The application of braking torque to the motor is so timed as to cause the subtracting machine to stall at a time in its machine cycle when the print bars 290 are elevated and when the various readout contacts represent the difference (0040) between this month's gas reading (5320) and last month's gas reading (5280). The timer-controlled contacts 50, 51, 52 and 53 become successively closed beginning at point 30 in the machine cycle and as a result thereof circuits are completed from the negative side of the line (right side of Fig. 1b) through these contacts, brushes 286, (also Fig. 12) contacts 285, cable 288, selected magnets 1d to 0d inclusive, normally closed contacts 339, to the line P++. Upon energization of the proper coder magnets, the lines 202, 203, 204 and 205 are selectively energized in the manner previously described and the perforator 220 is caused to perforate the gas consumption figure (0040) on the billing data tape 152.

The timer-controlled contacts 54 and 55 become closed at point 33 in the machine cycle and remain closed until point 45. Simultaneously the contacts 57, 58, 59 and 60 become closed and remain closed. Upon closure of the contacts 54, a circuit is completed from the positive side of the line (Figs. 1b and 25b) through the contacts 53, brushes 287 (see also Fig. 12), cable 299, and magnets 306' 306'' (of the common group 306 of Fig. 23). Upon closure of the contacts 55, a circuit is completed from the negative side of the line through the contacts 55, brushes 287', cable 298 to the magnets 307'. Closure of the contacts 54 and 55 also complete circuits through the wire groups 297 and 330 for selective energization of the magnets 305 (Fig. 23).

Such selective energization of the magnets 305 and 306 serves to effect cross selection in the cross bar selector of Fig. 23 in the manner previously described thus making such data as dollars and cents values of the gas charge which in Fig. 5 is shown as being $3.98, the gas tax of $.09 and the gas total of $4.07.

Upon closure of the contacts 57, 58, 59 and 60 (Fig. 25a) the previously described circuits leading through the wire group 297 (Figs. 25a and 25b) are completed to the magnets 1e, 2e, 3e and 4e of the rate selector mechanism 312 for selection of the magnets 305 pertaining to gas consumption.

The timer-controlled contacts 56 become closed at point 34 in the machine cycle to connect the stop line 259 to the negative side of the power line in case of an under consumption or an over consumption figure as previously described. If the over consumption is by virtue of the hundreds print bar 290 rising so that the brush 287 (Fig. 12) engages the 3 to 6 contacts of the hundreds group, a circuit will be completed from the P++ line (Fig. 25b) through the contacts 56 through the over consumption contact and brush 287 to the negative side of the line. If the over consumption is by virtue of the thousands print bar rising from its zero position, the line 330 will become open to disconnect the common to the rate selection magnets 305 of Fig. 25a and also a circuit will exist through the magnet 331, thus closing the contacts 332 to connect the stop line to the negative side of the power line.

After selection of the magnets 305 and 306 has been made, the predetermined dollars and cents values for gas charge, gas tax and gas total which have been set into the data storing device of Fig. 18 are made available for readout purposes by closure of the selected contact groups 318 (see also Fig. 23). Upon closure of the contacts 61, 62, 63 and 64, selective circuits are completed from the negative side of the line (Fig. 18) through the contacts 61, 62, 63, 64, contacts 318 of the selected group, common bars 319, cable 201 to the magnets 1d, 2d, 3d, etc. of the coder 200 (Fig. 8) and from thence to the P++ line. Energization of the selected coding magnets causes selective closure of the various coder contacts and energization of the lines 202, 203, 204 etc. (Figs. 8 and 1b) and perforation of the gas charge on the billing data tape.

Closure of the contacts 65, 66, 67 and 68 (Fig. 18) is without function as far as gas billing is concerned inasmuch as no fuel adjustment is involved. Subsequent closure of the contacts 69 and 70 cause the gas tax to be perforated in the billing data tape by completion of circuits similar to those traced above in connection with perforation of the gas charge. Likewise, closure of the contacts 71, 72, 73 and 74 cause the billing data tape to be perforated with the total gas charge.

Summarizing at this point in the machine cycle, the account number has been verified and perforated on the billing data tape 152, the rate character has been perforated. This month's gas reading and last month's gas reading have each been perforated and also the difference between them has been determined and perforated as a consumption figure on the tape. Also, the dollars and cents values representing the gas charge for gas consumed according to the specified rate, the gas tax and the total gas charge have been perforated on the billing data tape.

Substantially the same operations as those just described are encountered in connection with electric processing of the tapes 150 and 151. Without going into such detailed circuit-tracing operations, closure of the contacts 75, 76, 77 and 78 (Fig. 1a) beginning at point 47 in the machine cycle accompanied by repetitious closing of the contacts 35, together with closing of the contacts 39, 40 and 41 cause this month's electric reading of 8950 (Fig. 4) to be decoded and set into the keyboard of the subtracter 157, as well as to be perforated on the tape 152. During these operations the contacts 39, 40 and 41 function in the manner and for the same purpose as previously described in connection with gas processing. At point 52 in the cycle the contacts 42 which control depression of the motor bar A of the subtracter become closed, thus setting the this month's electric reading into the totalizing mechanisms of the subtracter. The contacts 79, 80, 81 and 82 (Fig. 1a) are repetitiously closed beginning at point 55 in the cycle and thus last month's electric reading of 8869 (Fig. 3) is set into the keyboard of the subtracter and also perforated on the tape 152. Contacts 43 which control the depression of the subtract key B are closed at point 49 and the subtracting operation takes place thus leaving the remainder 0087 (Fig. 5) in the totalizer. The usual idling cycle is effected by closure of the contacts 42 at point 64 in the machine cycle. The contacts 44 are closed at point 67 in the cycle and the total key C is thereby depressed. The contacts 45 are opened at point 69 in the cycle to open the motor circuit and allow the subtracter to stall while the contacts 36 again operate to apply a braking action to the motor. The subtracter comes to rest in such a position that the print bars thereof are elevated and the remainder representing the electric consumption in kw.-hr. is available for readout purposes.

The timer-controlled contacts 50, 51, 52 and 53 (upper regions of Fig. 1b) are closed in succession beginning at point 70 in the cycle and circuits are thus completed in the manner described in connection with the processing of gas data which cause the consumption figure to be relayed to the coder for coding and subsequent perforation on the billing data tape 152. At the same time during closing of the contacts 54 and 55 at point 74 in the machine cycle accompanied by closure of the contacts 83, 84, 85 and 86 (Fig. 25a), selection is made in the data storing device according to the proper rate in effect of the dollar and cents values of the various electric charges including charge, fuel adjustment, tax and total. To perforate these items on the billing data tape, the contacts 61 to 74 inclusive of Fig. 18 are successively closed beginning at point 85 and ending at point 97 in the machine cycle. Such perforation takes place in exactly the same manner as that previously described in connection with gas billing except for the fact that the contacts 65, 66 and 67, instead of closing without function serve to readout the data for fuel adjustment which as shown on the tape 152 of Fig. 5 amounts to $.02. The amounts thus perforated on the tape are electric charge $4.11, fuel adjustment $.02, electric tax $.10 and total charge $4.23.

The timer-controlled contacts 89 and 90 are then simultaneously momentarily closed, causing the billing data tape 152 to advance one position, creating a separation between successive accounts.

To provide for the advancement of the primary tapes 150 and 151, the timer-controlled contacts 88 are held closed, while the timer-controlled contacts 87 are momentarily closed fourteen times. The solenoids 175 and 175' are thereby energized, thus causing the pins 168 and 168' to be removed from engagement with the tapes 150 and 151 respectively. The circuit through the magnets 175 and 175' extends from the line P++ (Fig. 1a) through contacts 88, magnets 175 and 175' in parallel, to the negative side of the line. The magnets 164 and 164', being energized fourteen times, and their respective ratchet mechanisms, are caused to advance the tapes 150 and 151 respectively fourteen positions in order to bring a new account into position for processing. The circuit through the magnets 164 and 164' extends from the P++ line, contacts 87, magnets 164 and 164' in parallel, to the negative side of the line. These operations may take place any time after that portion of the cycle during which the sensing of the electrical readings on the tapes 150 and 151 has been accomplished.

Perforation of a complete field on the billing data tape has thus far been described, the field being prepared from data having no irregularities.

As previously mentioned, irregularities may include lack of verification between this month's and last month's account numbers; verification of this month's and last month's account number with the number perforated on the card 154; change of rate resulting in two different rate characters on this month's tape and last month's tape respectively; the consumption of a quantity of gas or electricity which is over the capacity of the data storing device 158; the presence of meter readings which will result in an odd-numbered consumption figure; the utilization of only one of the two services by a consumer, or the presence of average readings (which must be so marked accordingly by state law), either individually or in combination. It is to be noted that the stop line 259 becomes connected to the negative power line when certain of the aforementioned irregularities are present, at a specific moment in the normal cycle of the machine operation.

When there is a lack of verification between the account numbers on the primary tapes, the timer-controlled contacts 7, when closed at point 2 in the machine cycle, connect the stop line 259 to the negative side of the power line as previously described. The timer-controlled contacts 7 also perform this act when both of the primary tape account numbers verify with the account number on the card 154.

The timer-controlled contacts 30, when closed, connect the negative side of the power line to the stop line 259 when there is a discrepancy in rate characters. The timer-controlled contacts 56 operate similarly in case an odd-numbered consumption figure, or a consumption figure above the capacity of the data storing device 158, is encountered.

In cases where only one service is utilized, or where averaged readings are to be perforated, more automatic means are employed to take care of the special functions needed to correctly process the accounts. These automatic means will be discussed presently. When the stop line 259 becomes connected to the negative side of the power line, the stop relay 252 becomes energized and locked in this condition by an action of the contacts 257. The contacts 258 break, thus deenergizing the start relay 247 and causing the subsequent opening of the contacts 255 which breaks the P++ line to the rest of the machine, making further automatic function of the machine impossible. The timer motor continues to rotate, however, until such time as the timer-controlled contacts 4 become opened in spite of the opening of the contacts 251. The machine stops in this manner each time any irregularity in the normal operation causes the stop line 259 to become connected to the negative side of the power line. The only manner in which the machine may be restarted consists in the opening of the switch 245 momentarily. This causes the main power line to be broken, since the drum 240 is in its last phase and the timer-controlled contacts 3 are open, and thus the stop relay 252 becomes deenergized.

There are many instances where the consumer utilizes gas without electricity, or vice versa. In cases such as this, the special character ⊗ is perforated in the place where the reading would ordinarily be applied to the primary data tape. This special character is, of course, decoded in the mechanism 188 and causes the contacts 186 on the special relay labeled ⊗ in Fig. 7 to close. The wires 335 and 336 of Fig. 1a will then be electrically connected together. A pair of contacts 91 are closed simultaneously with the decoding of the first character of this month's reading for both gas and electricity. However, should this character be ⊗, in either case the magnet 337 will become energized and remain energized until the contacts 92 become opened later in the cycle. The contacts 92 close simultaneously with the contacts 91 and remain closed as long as it is necessary to maintain the magnet 337 energized. When this latter magnet is energized, a pair of normally closed contacts 338 become opened, thus interrupting the common line 188 from the input of the decoder 180. The contacts 339 open and similarly interrupt the common line 209 leading from the input of the coder. The contacts 340 close, thus locking the magnet 337 and maintaining the same energized. The contacts 341, 342, 343, 344, 345 and 346, which are controlled by the relay magnet 337, shunt the decoding mechanism out of the circuit leading from the sensing device to the perforator and connect these two latter devices directly through a group of timer-controlled contacts 93, 94, 95, 96, 97 and 98. These latter contacts are closed twenty-three times between points 7 and 45 in the machine cycle during that portion of the machine cycle relating to gas billing and are closed twenty-six times between points 47 and 88 in the machine cycle during that portion of the machine cycle relating to electric billing. The circuits by means of which the character ⊗ is perforated on the tape are apparent at the upper region of Fig. 1b. With the magnet 337 energized and its various contacts closed, circuits will extend from the P++ line, through the contacts 341 to 346, contacts 93 to 98, and cable 234 to the perforator for actuation of the same in the manner previously described.

When the timer-controlled contacts 341 to 346 inclusive become energized, they allow the special character ⊗ to be perforated on the billing data tape in the place where the monthly readings, including consumption, fuel adjustment charges, tax charge, would ordinarily be perforated. The special character ⊗ is perforated in place of the latter items to keep the relative position of the billing data tape in order. The relay magnet 337 is, therefore, utilized to blank out either the gas or the electric part of the cycle, or both, automatically.

In many instances, an average reading is employed for compounding the data which appears on the primary data tape. In certain States it is required by law that a bill so compounded be marked with a suitable legend in order that the consumer may be aware of the fact that it is an average reading. Such average readings frequently occur by virtue of the inability of the employee who ordinarily reads the meter to gain access to the meter. Since an average meter reading is not indicated on the primary data tapes, and since it must be applied to the billing data tape, some sort of indication must be employed in order that the operator of the machine will be aware of the fact that the billing is to be an average reading billing. Toward this end, a special card, such as the card 177 in Fig. 21, is prepared for each average reading account. As in the case of the card 154 of Fig. 19, this card 177 is perforated with the account number in the upper left-hand corner. The card is inserted into the special sensing device 145a. The card 177 should not cause the apparatus to stop, however, but merely to set up or instigate a train of events which will ultimately result in the perforating of the billing data tape with the character ⊗ in the required index point positions. Therefore, when the card 177 is inserted in the machine, the switch 351 should be manually thrown. Thus, when the account numbers on the primary tapes verify with the number on the card 177, the relay magnet 275 becomes energized, as previously described. Due to the fact that the switch 351 is thrown on and the timer-controlled contacts 352' and 353 are also closed, the magnet 354' will become energized because it is connected in parallel with the magnet 275.

The contacts which come under the influence of the magnet 275 (see Fig. 1a) and the contacts which come under the influence of the magnet 354' (see Fig. 1b) are opposite in action and one set counteracts the other. Therefore, when both magnets are energized, the circuits controlled thereby remain in effect. The magnet 354', when energized, becomes locked. The timer-controlled contacts 99, when closed (in the event that the magnet 354' is energized), will cause perforation of the ⊗ character. Although the timer-controlled contacts 99 close once every cycle, their closing has no effect unless the magnet 354' is energized. Upon perforation of the ⊗ character, the pair of timer-controlled contacts 99 also cause the magnet 356' to become energized and locked, as mentioned before. This can occur only if the magnet 354' is energized. When the magnet 356' is energized, an electric lamp 357 or other signaling device becomes lighted to signal the operator.

The timer-controlled contacts 100 close once at the end of each cycle and should the magnet 356' still be energized at this moment, the timer-controlled contacts 100 will effectively connect the stop line 259 to the negative side of the power line through a pair of contacts 358' on the magnet 356', thus stopping the machine. When the lamp 357 is lighted, the operator should remove the card 177 from the special sensing device 145a and replace it with the card which is prepared for the next special account in sequence. He should also open the switch 351 and when, after this switch 351 is opened, the timer-controlled contacts 100 become closed, no action will take place and the machine will continue to run.

The machine will stop at the end of a cycle merely as a precautionary measure in case the operator should be away from the machine at the moment an average bill is encountered. This is necessary because the next account to be processed might require a new account card to be in readiness for it and unless the machine is restored to its normal condition again, the next account will not be properly processed.

The invention is not to be limited to the exact arrangement of parts shown in the accompanying drawings or described in this specification as various changes in the details of construction may be resorted to without departing from the spirit of the invention. For example, while the invention has been illustrated and described in connection with an apparatus which is designed for use in the processing of accounts wherein two commodities are jointly billed, it is obvious that by suitable modification or elimination of parts the apparatus may be adapted for use in connection with accounts which are concerned with only one commodity or with more than two commodities. Only insofar as the invention has been pointed out in the accompanying claims is the same to be limited.

What is claimed is:

1. In a cyclically operable public utility accounting machine for perforating a billing data record according to perforated data appearing on two primary records by the direct reproduction of certain data appearing on the primary record and by the selection of precomputed values under the control of other data by said primary records and the perforating thereof on the billing data record, a sensing device for each primary record, a perforating device for the billing data record, a plurality of data storing devices each having means for storing data computed according to a predetermined schedule, said devices being arranged for cross selection in groups and individually, a computing mechanism common to the sensing devices, timer control means for controlling the operation of said sensing devices, perforating device, and computing mechanism, means operable under the control of said timer control means for selecting a group of data storing devices according to the sensing of certain data on the primary records and for simultaneously actuating the perforating device for direct reproduction of such perforated data on the billing data record, means operable under the control of said timer control means for actuating the computing mechanism according to the sensing of other data on one primary record and subsequently according to the sensing of other data on the other primary record, means operable under the joint control of said timer control means and computing mechainsm for selecting an individual data storing device within the previously selected group of such devices, and means operable under the control of said timer control means for actuating the perforating device according to the selected data to perforate the same on the billing data record.

2. In a cyclically operable public utility accounting machine for perforating a billing data record according to perforated data appearing on two primary records and relating to meter readings including a rate character for determining the character of service rendered, an account number under which individual accounts are billed, and consumption figures, said machine being adapted for direct reproduction of the rate character and account number on the billing data record, for computing values obtained from the subtraction of consumption figures according to a predetermined schedule, and for perforating the billing data record according to the computed values, a sensing device for each primary record, a perforating device for the billing data record, a plurality of data storing devices each having means for storing data computed according to the prearranged schedule, said device being arranged for cross selection in groups and individualy, a computing mechanism common to the sensing devices, timer control means for controlling the operation of said sensing devices, perforating device and computing mechanism, means operable under the control of said timer control means for selecting a group of data storing devices according to the sensing of said rate character and for simultaneously actuating the perforating device for direct reproduction of the rate character on the billing data record, means operable under the control of said timer control means for actuating the computing mechanism according to the sensing of consumption figures on one primary record and subsequently according to the sensing of consumption figures on the other primary record, means operable under the joint control of said timer control means and computing mechanism for selecting an individual data storing device within the previously selected group of such devices, and means operable under the control of said timer control means for actuating the perforating device according to the selected data to perforate the same on the billing data record.

3. In a public utility accounting machine which is record controlled from a pair of primary perforated records, one of which contains information relating to previous meter readings and the other of which contains information relating to subsequent meter readings and including a rate character for determining the character of service rendered, and consumption figures, said machine being adapted for direct reproduction of the rate character on a billing data record for obtaining the difference between the previous meter reading and the subsequent meter reading, for perforating the billing data record according to said difference and for perforating the billing data record with data which is computed from said difference according to a prearranged schedule, cyclically operated contact means including timer control means for controlling the operation of said machine, a sensing device for each primary record, a perforating device for the billing data record, a plurality of data storing devices each having means for storing data computed according to the prearranged schedule, said devices being arranged for electrical cross selection in groups and individually, means operable under the control of said timer control means for selecting a group of data storing devices according to the sensing of said rate character and for simultaneously actuating the perforating device for direct reproduction of the rate character on the billing data record, subtracting mechanism common to the sensing devices, a normally open circuit associated with said subtracting mechanism and operable upon closing thereof to render said contact means ineffective, means also operating under the control of said timer control means for actuating the subtracting mechanism according to the sensing of said consumption figures to obtain a remainder from the difference between the previous meter reading on one primary record and the subsequent meter reading on the other primary record, means operating under the joint control of said timer control means and computing mechanism for selecting an individual data storing device within the previously selected group of such devices, means also operating under said joint control for actuating the perforating device to perforate said remainder on the billing data record and also to perforate the selected precomputed data thereon, and means operable when said remainder exceeds a predetermined value for closing said normally open circuit.

4. In a public utility accounting machine which is record controlled from a pair of primary perforated records containing information relating to meter readings and including a rate character for determining the character of service rendered, and consumption figures, said machine being adapted for computing values obtained from the consumption figures for perforating said computed values on a billing data record and for perforating data which is precomputed according to a prearranged schedule from said computed values on the billing data record, cyclically operated contact means including timer control means for controlling the operation of said machine, a sensing device for each primary record, a perforating device for the billing data record, a plurality of data storing devices each having means for storing data according to the prearranged schedule, said data storing devices being arranged for cross selection in groups and individually, means operating under the control of said timer control means for selecting a group of data storing devices according to the sensing of said rate character, a computing mechanism common to the sensing devices, a plurality of normally open circuits selectively closeable upon operation of the computing mechanism, certain of said circuits controlling the operation of said perforating mechanism and at least one of said circuits being operable when closed to render said contact means ineffective and stop the operation of the machine, means operating under the joint control of said timer control means and said sensing device for actuating the computing mechanism to obtain values according to the sensing of said consumption figures, means operable under the joint control of said timer control means and computing mechanism for selecting an individual data storing device within the previously selected group of such devices, means operated under the control of said selected device for selectively closing certain of said circuits to perforate the selected precomputed data on the billing data record, and means operable under the joint control of said timer control means and computing mechanism for closing the specified circuit which effects stopping the operation of the machine when the computing mechanism is actuated in such a manner as to obtain values which exceed a predetermined amount.

WARD LEATHERS.
JERRIER HADDAD.

REFERENCES CITED

The following references are of record in the file of this patent:

UNITED STATES PATENTS

| Number | Name | Date |
|---|---|---|
| 1,834,561 | Watson | Dec. 1, 1931 |
| 2,034,260 | Johnstone | Mar. 17, 1936 |
| 2,045,437 | Daly | June 23, 1936 |
| 2,176,953 | Smith | Oct. 24, 1939 |
| 2,178,064 | Bryce | Oct. 31, 1939 |
| 2,285,353 | Peirce | June 2, 1942 |
| 2,288,520 | Geller | June 30, 1942 |
| 2,314,718 | Leathers et al. | Mar. 23, 1943 |
| 2,332,304 | Davies | Oct. 19, 1943 |
| 2,352,027 | Smith | June 20, 1944 |
| 2,386,482 | Leathers et al. | Oct. 9, 1945 |
| 2,393,386 | Leathers et al. | Jan. 22, 1946 |